US012720341B2

(12) United States Patent
Kim

(10) Patent No.: US 12,720,341 B2
(45) Date of Patent: Aug. 25, 2026

(54) METHOD AND APPARATUS FOR ACTIVATING OR DEACTIVATING A SCG IN WIRELESS COMMUNICATION SYSTEM

(71) Applicants: BLACKPIN INC., Seoul (KR); Soenghun Kim, Hanam-si (KR)

(72) Inventor: Soenghun Kim, Hanam-si (KR)

(73) Assignees: BLACKPIN INC., Seoul (KR); Soenghun Kim, Hanam-si (KR)

( * ) Notice: Subject to any disclaimer, the term of this patent is extended or adjusted under 35 U.S.C. 154(b) by 353 days.

(21) Appl. No.: 18/110,376

(22) Filed: Feb. 16, 2023

(65) Prior Publication Data

US 2023/0276279 A1 Aug. 31, 2023

(51) Int. Cl.
*H04W 24/08* (2009.01)
*H04W 8/22* (2009.01)
*H04W 76/28* (2018.01)

(52) U.S. Cl.
CPC ............. *H04W 24/08* (2013.01); *H04W 8/22* (2013.01); *H04W 76/28* (2018.02)

(58) Field of Classification Search
CPC ....... H04W 24/08; H04W 8/22; H04W 76/28; H04W 8/24; H04W 76/15; H04W 76/16; H04W 76/27; Y02D 30/70
See application file for complete search history.

(56) References Cited

U.S. PATENT DOCUMENTS

2016/0081020 A1* 3/2016 Rahman ................ H04W 24/10 370/311
2016/0165539 A1* 6/2016 Yi ..................... H04W 52/0216 370/311
2019/0215747 A1* 7/2019 Wu ................... H04W 36/0066
2020/0329369 A1* 10/2020 Pals ........................ H04L 5/001
2021/0051767 A1* 2/2021 Zhang ................... H04W 76/34
2023/0069951 A1* 3/2023 Araujo ............. H04W 72/0453
2023/0189383 A1* 6/2023 Liu .................. H04W 52/0216 370/329
2023/0379998 A1* 11/2023 Jung ..................... H04W 76/20
2024/0056927 A1* 2/2024 Kim .................... H04W 36/185
2024/0057199 A1* 2/2024 Tsuboi .................. H04W 76/25
2024/0292240 A1* 8/2024 Mattam ................. H04L 5/0023
2024/0365146 A1* 10/2024 Hu ........................ H04W 24/10
2025/0081110 A1* 3/2025 Li ......................... H04W 24/08
2025/0159574 A1* 5/2025 Wu ....................... H04W 36/06

* cited by examiner

*Primary Examiner* — Ayman A Abaza
*Assistant Examiner* — Alyssa Williams
(74) *Attorney, Agent, or Firm* — Nicholas Park

(57) ABSTRACT

A method and apparatus for radio link monitoring on primary SCG cell are provided. The method includes transmitting by a terminal a first message to report UE capability, receiving a second message by the terminal to activate or deactivate a secondary cell group and performing by the terminal radio link monitoring on primary SCG cell.

5 Claims, 10 Drawing Sheets

Figure 3:
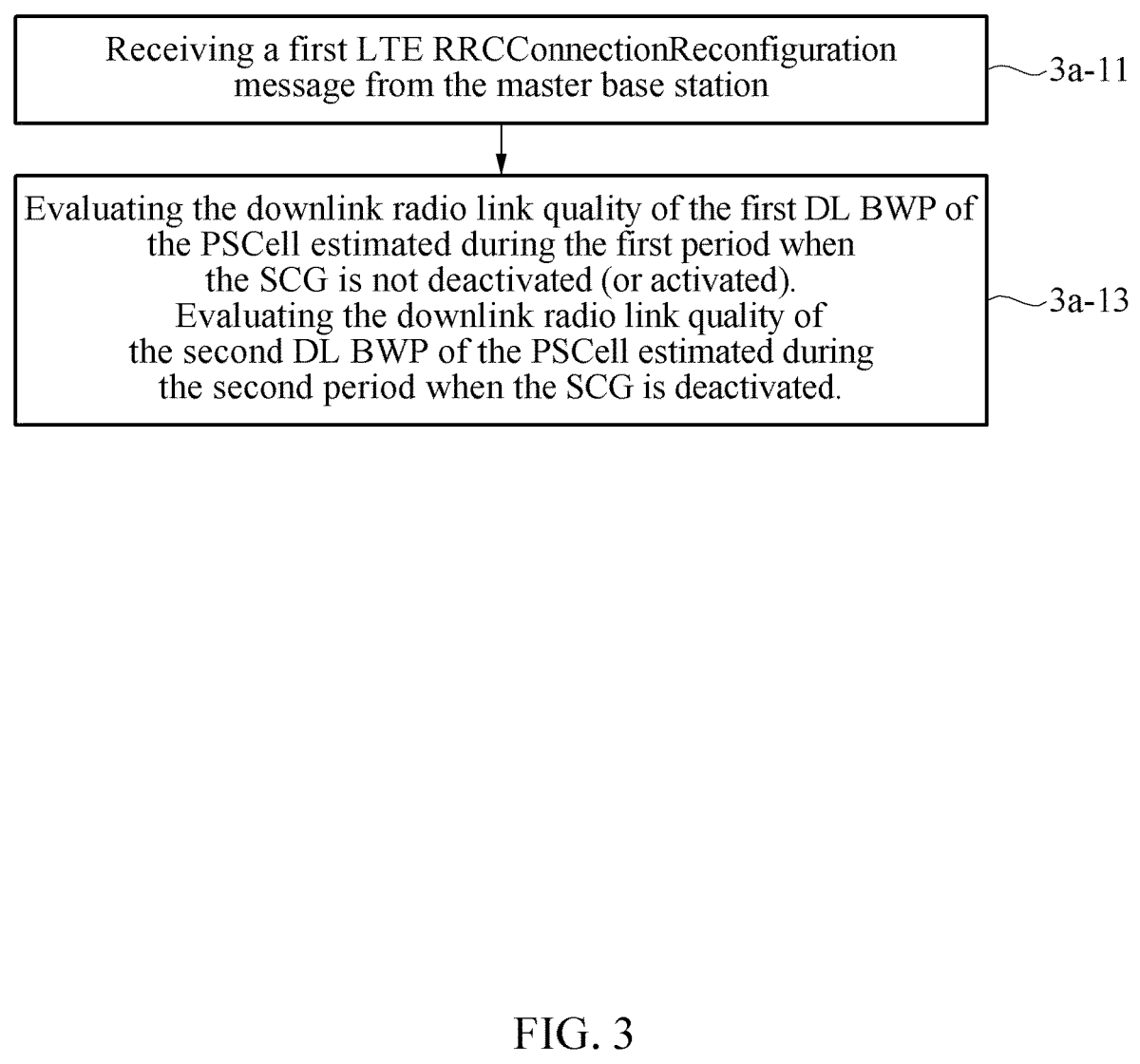

Receiving a first LTE RRCConnectionReconfiguration message from the master base station 3a-11

Evaluating the downlink radio link quality of the first DL BWP of the PSCell estimated during the first period when the SCG is not deactivated (or activated).
Evaluating the downlink radio link quality of the second DL BWP of the PSCell estimated during the second period when the SCG is deactivated.

METHOD AND APPARATUS FOR ACTIVATING OR DEACTIVATING A SCG IN WIRELESS COMMUNICATION SYSTEM

CROSS-REFERENCE TO RELATED APPLICATION

This application claims priority to and the benefit of Korean Patent Application No. 10-2022-0025086, filed on Feb. 25, 2022, the disclosure of which is incorporated herein by reference in its entirety.

BACKGROUND

Technical Field

The present disclosure relates to a method and apparatus for a terminal to perform radio link monitoring on primary SCG cell of activated or deactivated secondary cell group.

Related Art

To meet the increasing demand for wireless data traffic since the commercialization of 4th generation (4G) communication systems, the 5th generation (5G) system is being developed. For the sake of high, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

LTE and NR are expected to coexist for considerable time to come. A single operator could deploy both LTE and NR within its network. For such case, providing to a UE both stable connection with LTE and high data rate with NR is possible if UE is connected to both. EN-DC enables simultaneous data transfer via LTE and NR.

SCG addition/change for EN-DC operation causes considerable delay and signaling load which can degrade performance and quality of service. For more efficient EN-DC operation, quicker SCG addition/change procedure is required.

SUMMARY

Aspects of the present disclosure are to address the various methods of implementing secondary cell group deactivation in mobile communication system. Accordingly, an aspect of the present disclosure is to provide a method and an apparatus for transmitting by a terminal a first message to report UE capability, receiving a second message by the terminal to activate or deactivate a secondary cell group and performing radio link monitoring on primary SCG cell.

FIG. IE is a diagram illustrating the architecture of an EN-DC to which the disclosure may be applied.

Figure 1A:
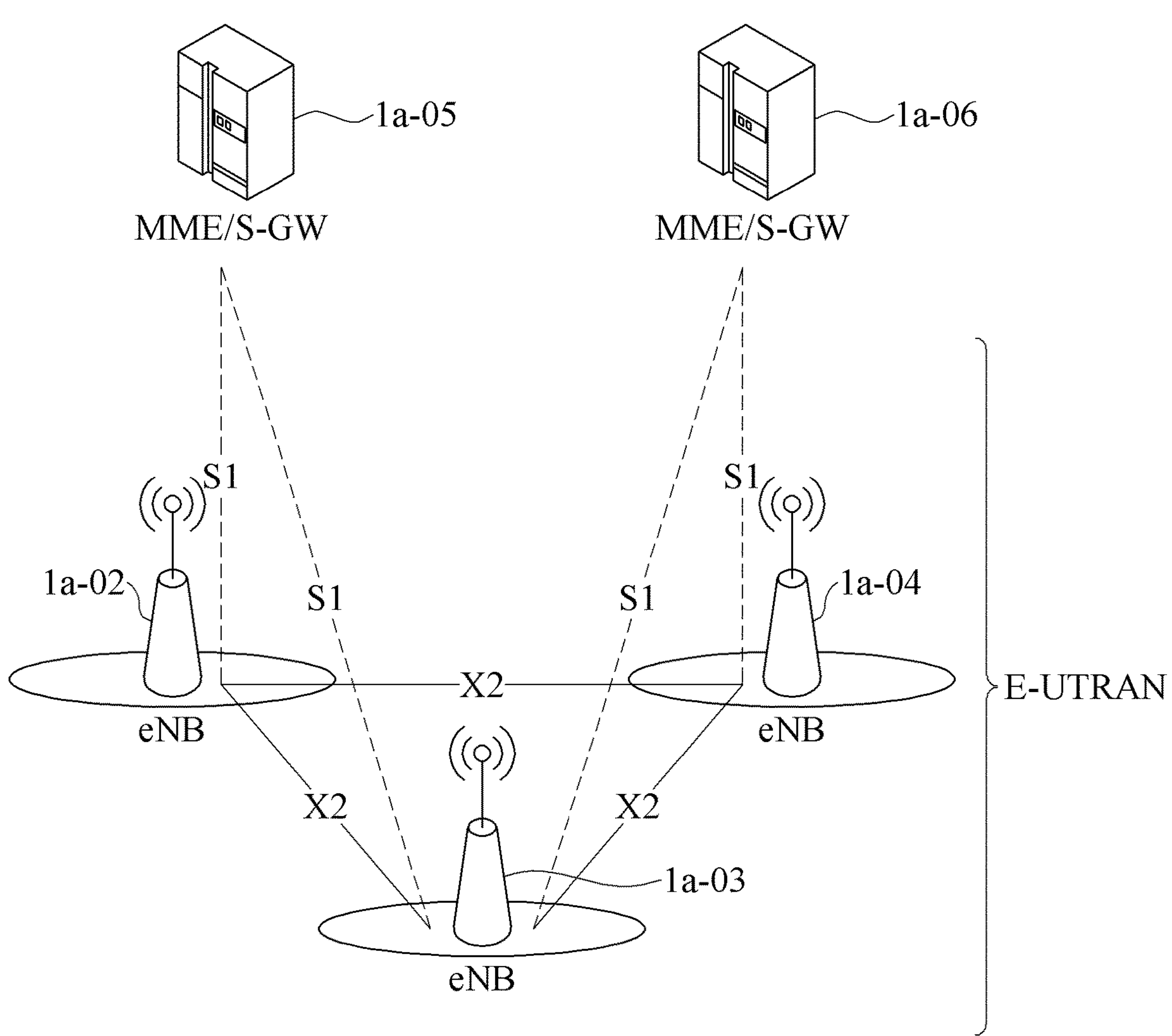
FIG. 1A is a diagram illustrating the architecture of an LTE system and an E-UTRAN to which the disclosure may be applied.
Figure 1B:
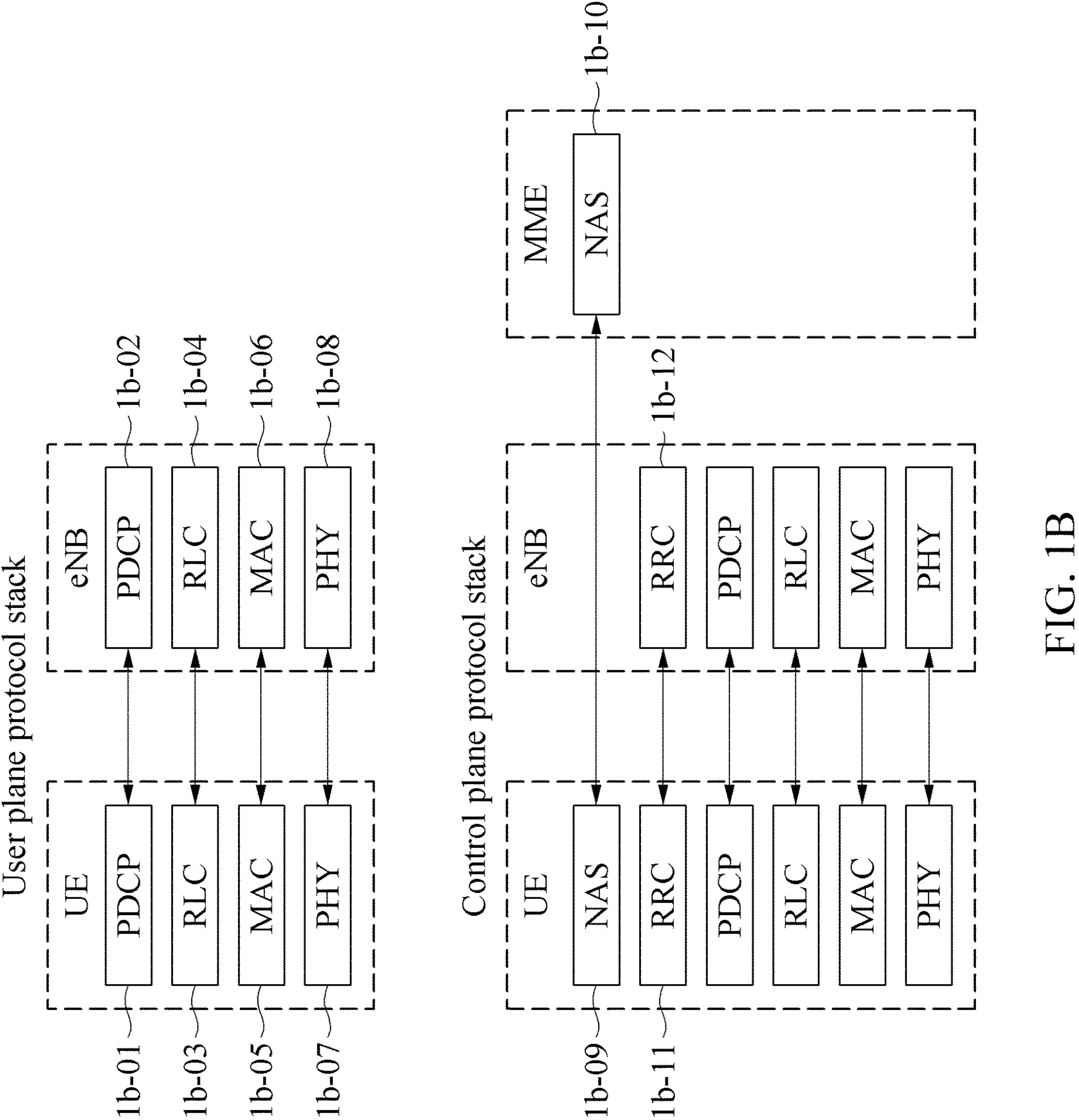
FIG. 1B is a diagram illustrating a wireless protocol architecture in an LTE system to which the disclosure may be applied.
Figure 1C:
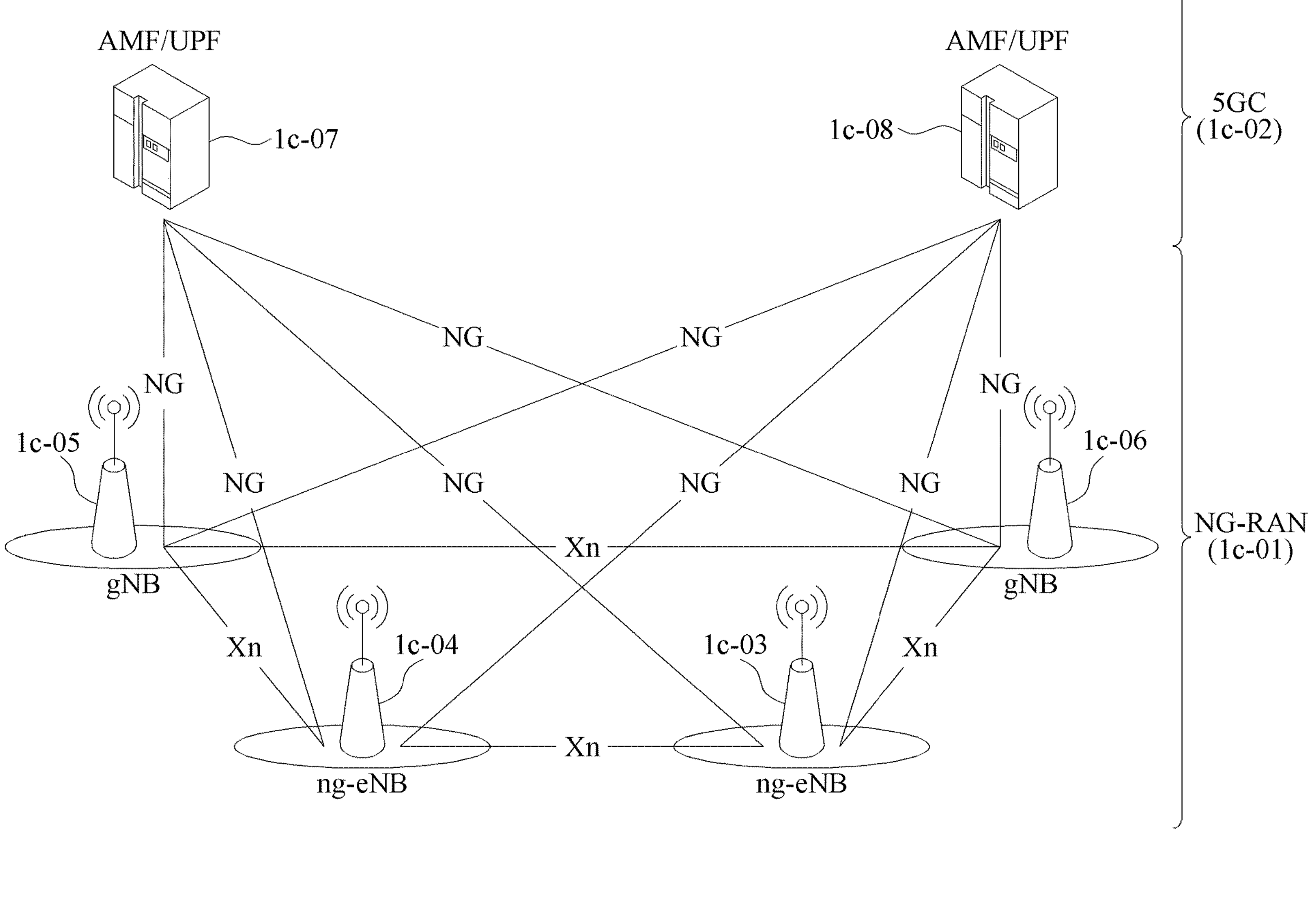
FIG. 1C is a diagram illustrating the architecture of an 5G system and a NG-RAN to which the disclosure may be applied.
Figure 1D:
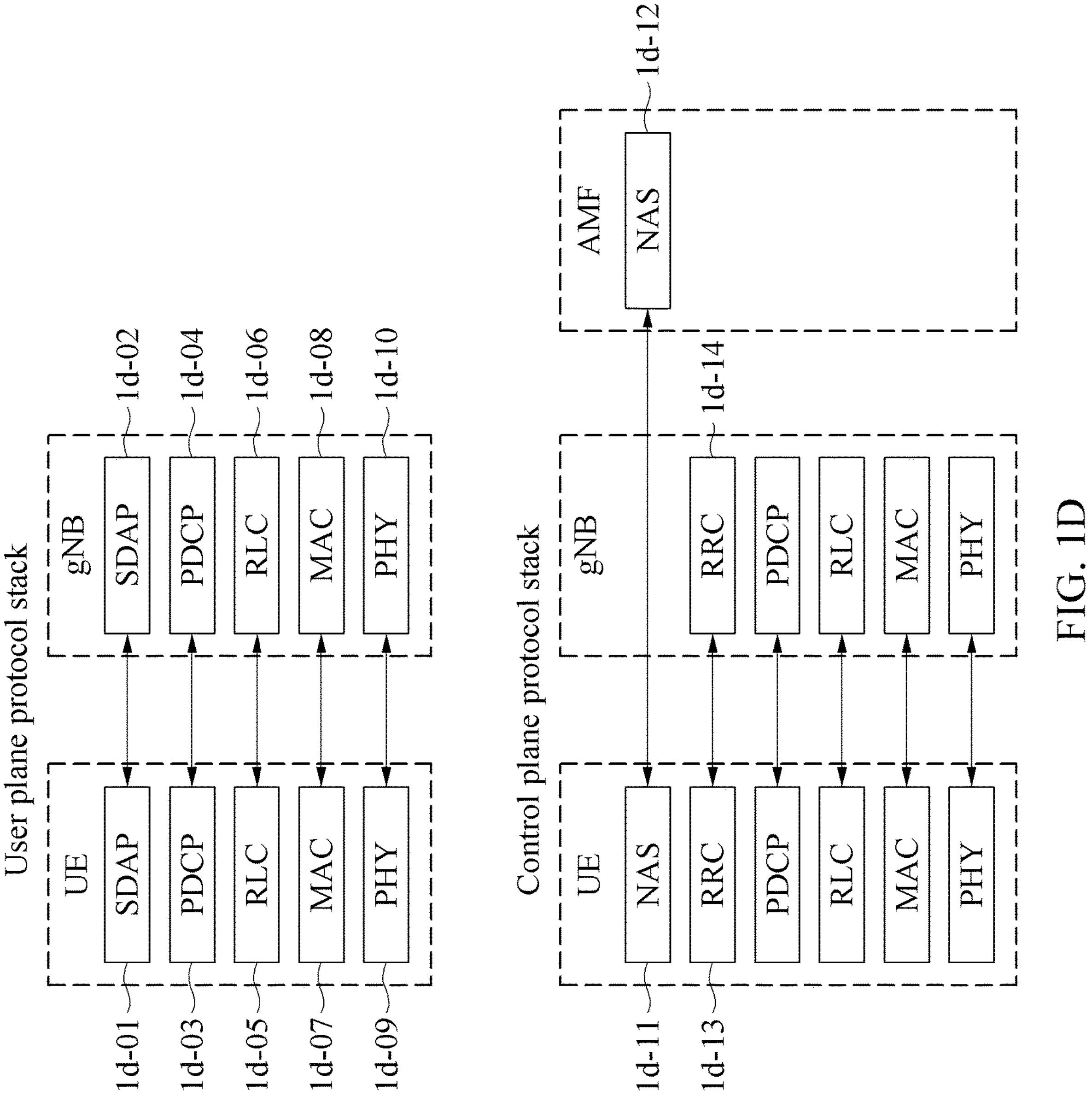
FIG. 1D is a diagram illustrating a wireless protocol architecture in an 5G system to which the disclosure may be applied.
Figure 1E:
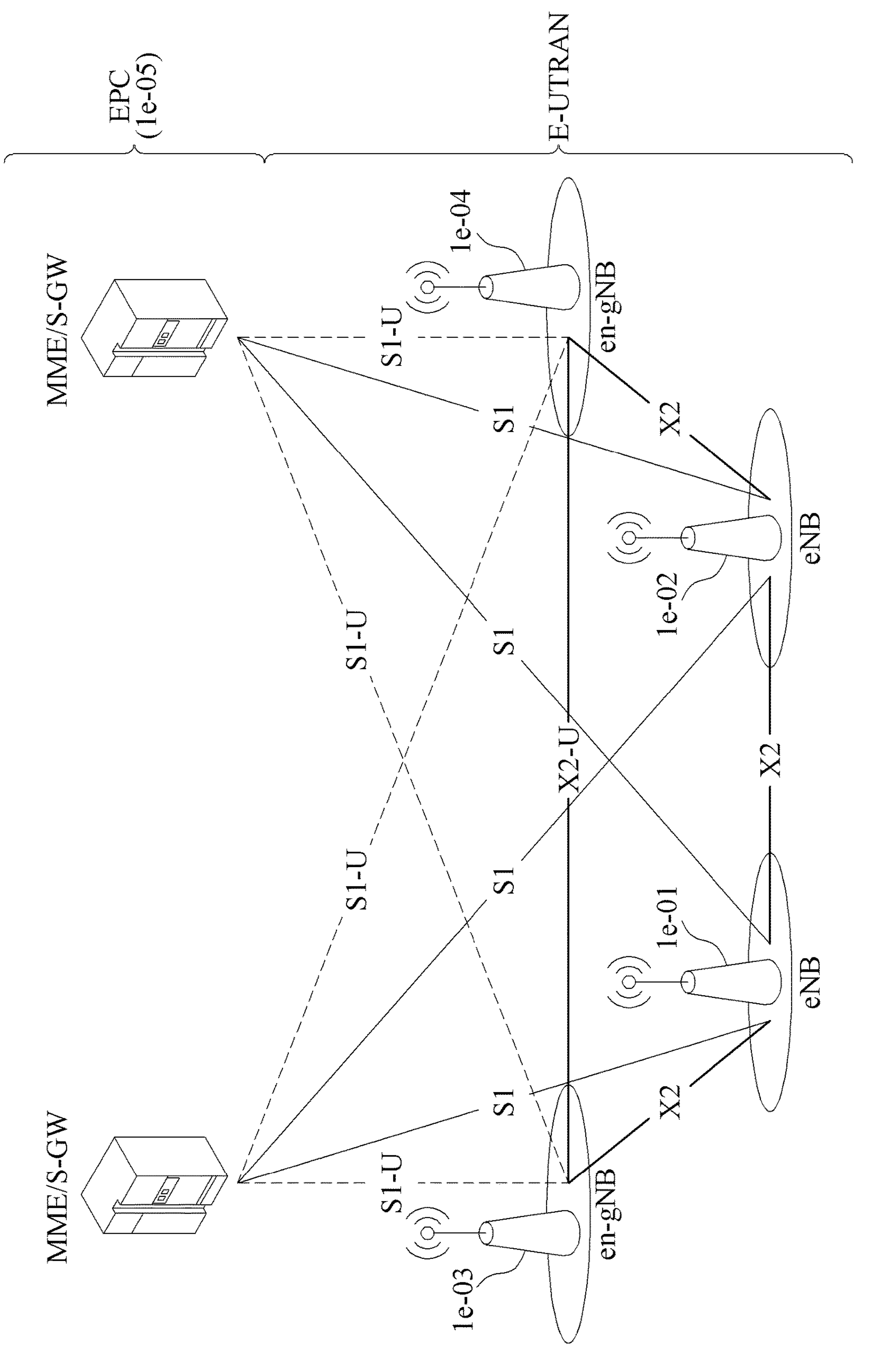
Figure 1F:
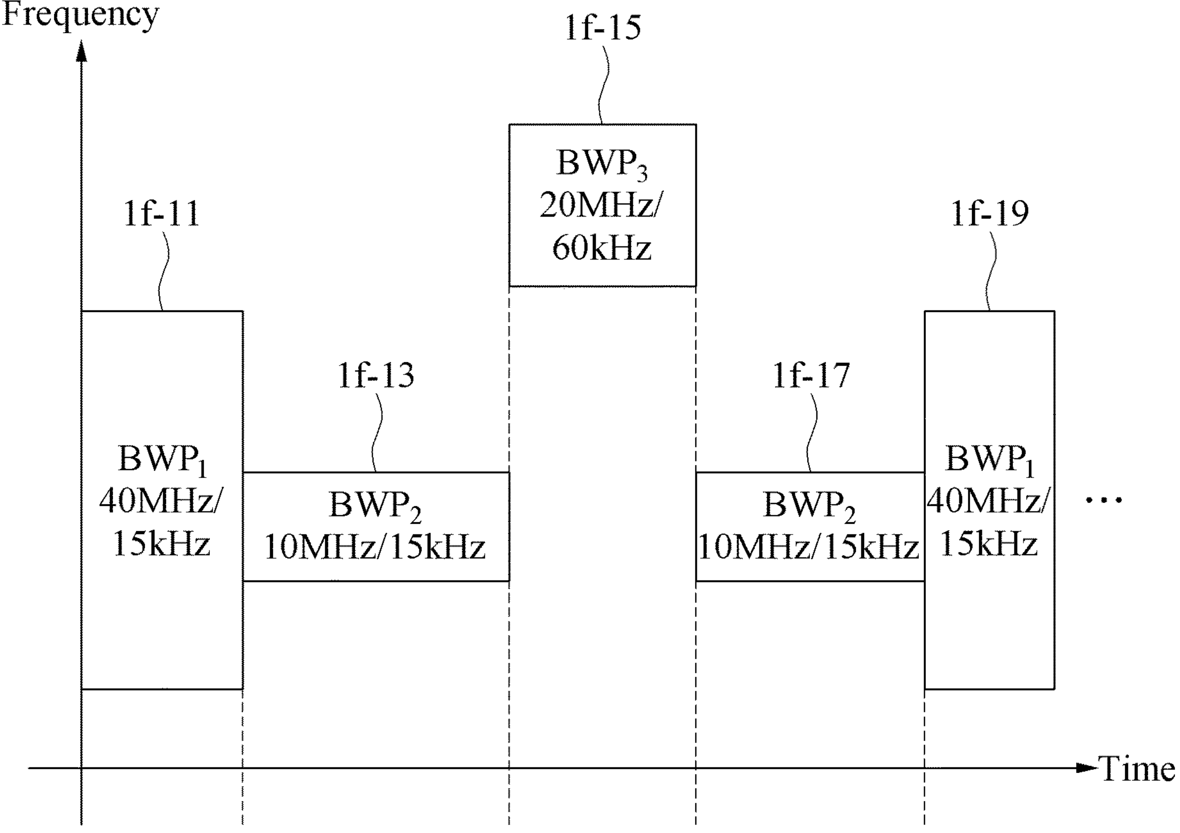

FIG. 1F is a diagram illustrating an example of a bandwidth part.

Figure 1G:
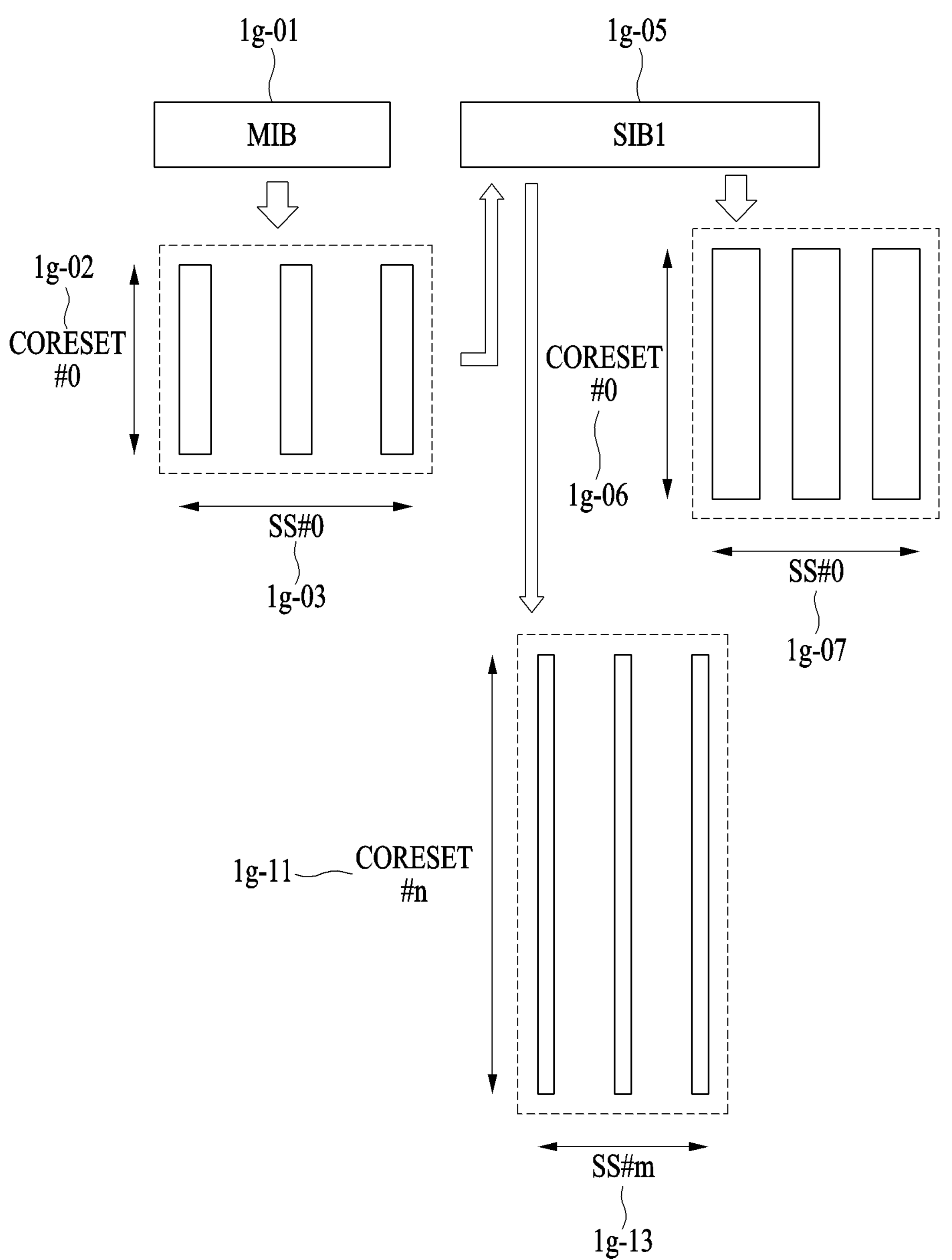

FIG. 1G is a diagram illustrating an example of a search space and a control resource set.

Figure 2:
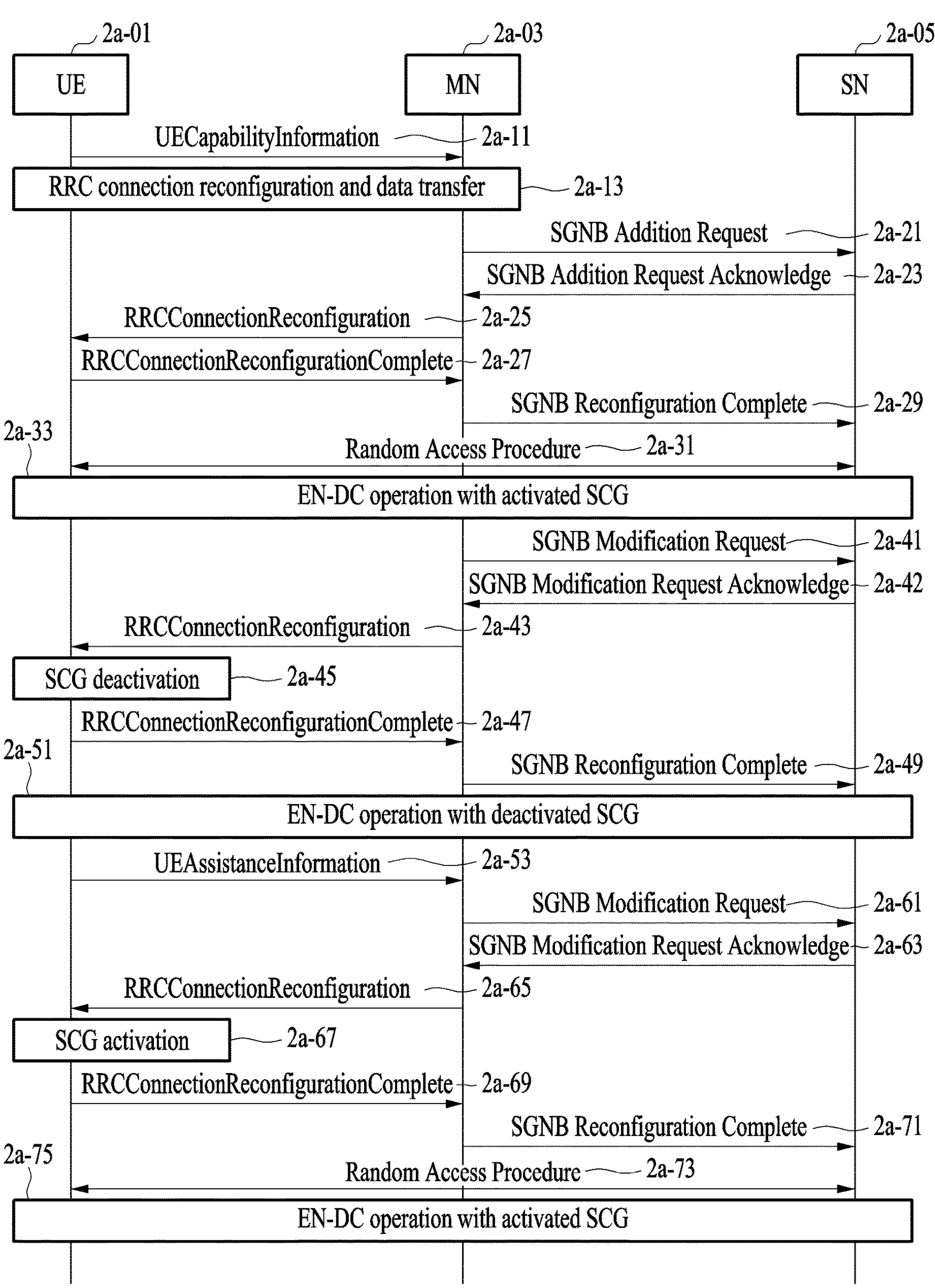

FIG. 2 is a diagram illustrating operations of a terminal and a base station according to an embodiment of the present invention.

FIG. 3 is a flow diagram illustrating an operation of a terminal.

Figure 4A:
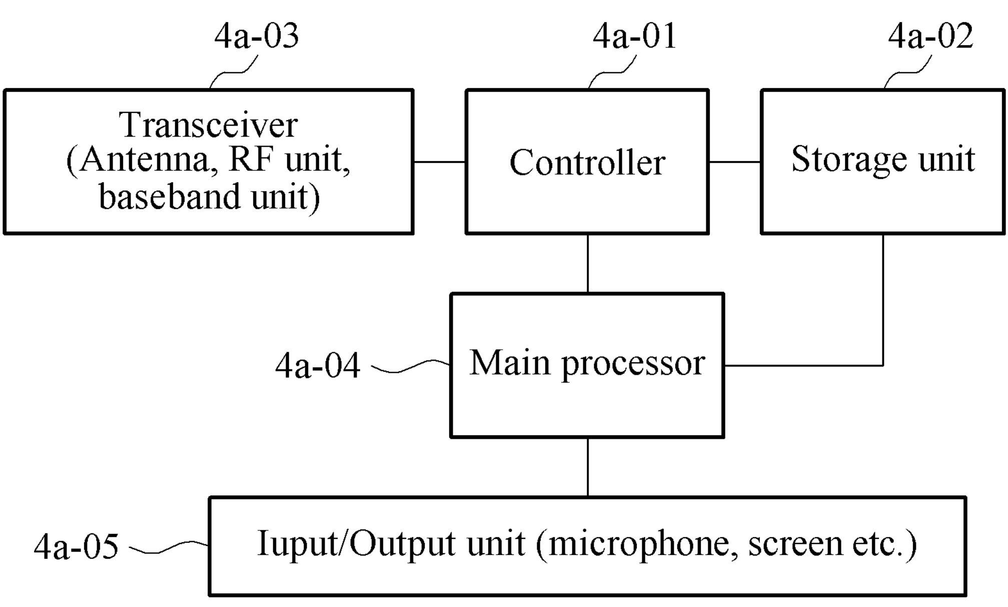

FIG. 4A is a block diagram illustrating the internal structure of a UE to which the disclosure is applied.

Figure 4B:
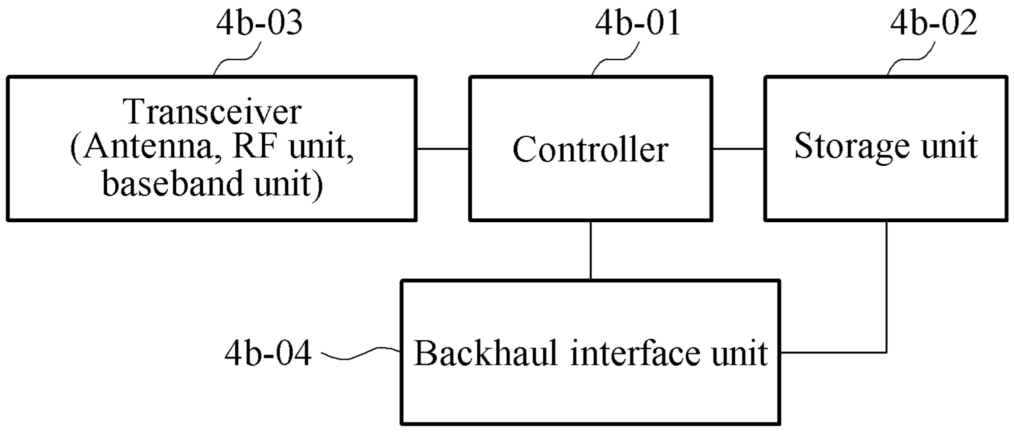

FIG. 4B is a block diagram illustrating the configuration of a base station according to the disclosure.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

In the following descriptions, UE and terminal are used as same terminology.

Table 1 lists the acronyms used throughout the present disclosure.

TABLE 1

| Acronym | Full name |
|---|---|
| 5GC | 5G Core Network |
| 5GS | 5G System |
| 5QI | 5G QoS Identifier |
| ACK | Acknowledgement |
| AMF | Access and Mobility Management Function |
| ARQ | Automatic Repeat Request |
| AS | Access Stratum |
| ASN.1 | Abstract Syntax Notation One |

TABLE 1-continued

| Acronym | Full name |
|---|---|
| BSR | Buffer Status Report |
| BWP | Bandwidth Part |
| CA | Carrier Aggregation |
| CAG | Closed Access Group |
| CAG-ID | Closed Access Group Identifier |
| CG | Cell Group |
| CHO | Conditional Handover |
| CIF | Carrier Indicator Field |
| CORESET | Control Resource Set |
| CPC | Conditional PSCell Change |
| CQI | Channel Quality Indicator |
| C-RNTI | Cell RNTI |
| CSI | Channel State Information |
| DC | Dual Connectivity |
| DCI | Downlink Control Information |
| DRB | (user) Data Radio Bearer |
| DRX | Discontinuous Reception |
| ECGI | E-UTRAN Cell Global Identifier |
| eNB | E-UTRAN NodeB |
| EN-DC | E-UTRA-NR Dual Connectivity |
| EPC | Evolved Packet Core |
| EPS | Evolved Packet System |
| E-RAB | E-UTRAN Radio Access Bearer |
| ETWS | Earthquake and Tsunami Warning System |
| E-UTRA | Evolved Universal Terrestrial Radio Access |
| E-UTRAN | Evolved Universal Terrestrial Radio Access Network |
| FDD | Frequency Division Duplex |
| FDM | Frequency Division Multiplexing |
| GBR | Guaranteed Bit Rate |
| HARQ | Hybrid Automatic Repeat Request |
| HPLMN | Home Public Land Mobile Network |
| IDC | In-Device Coexistence |
| IE | Information element |
| IMSI | International Mobile Subscriber Identity |
| KPAS | Korean Public Alert System |
| L1 | Layer 1 |
| L2 | Layer 2 |
| L3 | Layer 3 |
| LCG | Logical Channel Group |
| MAC | Medium Access Control |
| MBR | Maximum Bit Rate |
| MCG | Master Cell Group |
| MCS | Modulation and Coding Scheme |
| MeNB | Master eNB |
| MIB | Master Information Block |
| MIMO | Multiple Input Multiple Output |
| MME | Mobility Management Entity |
| MN | Master Node |
| MR-DC | Multi-Radio Dual Connectivity |
| NAS | Non-Access Stratum |
| NCGI | NR Cell Global Identifier |
| NE-DC | NR-E-UTRA Dual Connectivity |
| NGEN-DC | NG-RAN E-UTRA-NR Dual Connectivity |
| NG-RAN | NG Radio Access Network |
| NR | NR Radio Access |
| NR-DC | NR-NR Dual Connectivity |
| PBR | Prioritised Bit Rate |
| PCC | Primary Component Carrier |
| PCell | Primary Cell |

TABLE 1-continued

| Acronym | Full name |
|---|---|
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PLMN | Public Land Mobile Network |
| PRACH | Physical Random Access Channel |
| PRB | Physical Resource Block |
| PSCell | Primary SCG Cell |
| PSS | Primary Synchronisation Signal |
| PUCCH | Physical Uplink Control Channel |
| PUSCH | Physical Uplink Shared Channel |
| PWS | Public Warning System |
| QFI | QOS Flow ID |
| QoE | Quality of Experience |
| QoS | Quality of Service |
| RACH | Random Access Channel |
| RAN | Radio Access Network |
| RA-RNTI | Random Access RNTI |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCC | Secondary Component Carrier |
| SCell | Secondary Cell |
| SCG | Secondary Cell Group |
| SCS | Subcarrier Spacing |
| SDAP | Service Data Adaptation Protocol |
| SDU | Service Data Unit |
| SeNB | Secondary eNB |
| SFN | System Frame Number |
| S-GW | Serving Gateway |
| SI | System Information |
| SIB | System Information Block |
| (S-/T-) SN | (Source/Target) Secondary Node |
| SpCell | Special Cell |
| SRB | Signalling Radio Bearer |
| SRS | Sounding Reference Signal |
| SSB | SS/PBCH block |
| SSS | Secondary Synchronisation Signal |
| SUL | Supplementary Uplink |
| TDD | Time Division Duplex |
| TDM | Time Division Multiplexing |
| TRP | Transmit/Receive Point |
| UCI | Uplink Control Information |
| UE | User Equipment |
| UL-SCH | Uplink Shared Channel |
| UPF | User Plane Function |

Table 2 lists the terminologies and their definition used throughout the present disclosure.

TABLE 2

| Terminology | Definition |
|---|---|
| Cell | combination of downlink and optionally uplink resources. The linking between the carrier frequency of the downlink resources and the carrier frequency of the uplink resources is indicated in the system information transmitted on the downlink resources. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Information element | A structural element containing single or multiple fields is referred as information element. |
| NR | NR radio access |
| PCell | SpCell of a master cell group. |

TABLE 2-continued

| Terminology | Definition |
|---|---|
| Primary SCG Cell | For dual connectivity operation, the SCG cell in which the UE performs random access when performing the Reconfiguration with Sync procedure. |
| Serving Cell | For a UE in RRC_CONNECTED not configured with CA/DC there is only one serving cell comprising of the primary cell. For a UE in RRC_CONNECTED configured with CA/ DC the term 'serving cells' is used to denote the set of cells comprising of the Special Cell(s) and all secondary cells. |
| SpCell | primary cell of a master or secondary cell group. |
| Cell Group | in dual connectivity, a group of serving cells associated with either the MeNB or the SeNB. |
| En-gNB | node providing NR user plane and control plane protocol terminations towards the UE, and acting as Secondary Node in EN-DC. |
| Master Cell Group | in MR-DC, a group of serving cells associated with the Master Node, comprising of the SpCell (PCell) and optionally one or more SCells. |
| Master node | in MR-DC, the radio access node that provides the control plane connection to the core network. It may be a Master eNB (in EN-DC), a Master ng-eNB (in NGEN-DC) or a Master gNB (in NR-DC and NE-DC). |
| NG-RAN node | either a gNB or an ng-eNB. |
| PSCell | SpCell of a secondary cell group. |
| Secondary Cell | For a UE configured with CA, a cell providing additional radio resources on top of Special Cell. |
| Secondary Cell Group | in MR-DC, a group of serving cells associated with the Secondary Node, comprising of the SpCell (PSCell) and optionally one or more SCells. |
| Secondary node | in MR-DC, the radio access node, with no control plane connection to the core network, providing additional resources to the UE. It may be an en-gNB (in EN-DC), a Secondary ng-eNB (in NE-DC) or a Secondary gNB (in NR-DC and NGEN-DC). |
| Conditional PSCell Change | a PSCell change procedure that is excuted only when PSCell execution condition(s) are met. |
| gNB Central Unit (gNB-CU) | a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. |
| gNB Distributed Unit (gNB-DU) | a logical node hosting RLC, MAC and PHY layers of the gNB or en-gNB, and its operation is partly controlled by gNB-CU. One gNB-DU supports one or multiple cells. One cell is supported by only one gNB-DU. The gNB-DU terminates the F1 interface connected with the gNB-CU. |
| E-RAB | An E-RAB uniquely identifies the concatenation of an S1 Bearer and the corresponding Data Radio Bearer. When an E-RAB exists, there is a one-to-one mapping between this E-RAB and an EPS bearer of the Non Access Stratum (NAS) as defined in TS 23.1d-01 [3]. |

Table 3 explains technical terminologies used throughout the present disclosure.

TABLE 3

| Terminology | Definition |
|---|---|
| PSCell change | It means the current PSCell changes to a new PSCell. It includes intra-SN PSCell change and inter-SN PSCell change. PSCell addition is also considered as PSCell change. |
| CG-ConfigInfo IE | The IE is transferred from MN to SN or from CU to DU. It includes following information<br>ue-CapabilityInfo includes various information for UE capability<br>MeasResultList2NR includes measurement results on the candidate cells for serving cell<br>DRX configuration of MCG |
| CG-Config IE | The IE is transferred from SN to MN or from CU to DU. It includes following information<br>NR RRCReconfiguration which includes SCG configuration informatino.<br>MN transfer the NR RRCReconfiguration message to UE without modifying it<br>Information related to SCG bearer. It includes the information indicating the security key for the bearer<br>DRX configuration of SCG<br>ARFCN indicating the center frequency of PSCell |

TABLE 3-continued

| Terminology | Definition |
|---|---|
| measConfig | It is configuration related to measurement and set by MN and SN separately. It comprise at least one measurement object (measObject), at least one report configuration (ReportConfig) and at least one measurement identity (measId). A measObject is identified by a MeasObjectId. A reportConfig is identified by a ReportConfigId. A measId comprises a measObjectId and a reportConfigId. MeasId instructs UE to perform a specific operation when measurement result on the associated measObject fulfils condition set by ReportConfigId |

FIG. 1A is a diagram illustrating the architecture of an LTE system and an E-UTRAN to which the disclosure may be applied.

The E-UTRAN consists of eNBs 1a-02, 1a-03, 1a-04, providing the E-UTRA user plane (PDCP/RLC/MAC/PHY) and control plane (RRC) towards the UE. The eNBs 1a-02, 1a-03, 1a-04 are interconnected with each other by means of the X2 interface. The eNBs are also connected to the MME (Mobility Management Entity) 1a-05 and to the Serving Gateway (S-GW) 1a-06 by means of the S1. The S1 interface supports a many-to-many relation between MMEs/Serving Gateways and eNBs. MME 1a-05 and S-GW 1a-06 may be realized either as a physical node or as separate physical nodes.

The eNB 1a-02, 1a-03, 1a-04 hosts the functions listed below.

Functions for Radio Resource Management such as Radio Bearer Control, Radio Admission Control, Connection Mobility Control, Dynamic allocation of resources to UEs in uplink, downlink and sidelink (scheduling); and IP and Ethernet header compression, uplink data decompression and encryption of user data stream; and Selection of an MME at UE attachment when no routing to an MME can be determined from the information provided by the UE; and Routing of User Plane data towards Serving Gateway; and Scheduling and transmission of paging messages (originated from the MME).

The MME 1a-05 hosts the functions such as NAS signaling, NAS signaling security, AS security control, S-GW selection, Authentication, Support for PWS message transmission and positioning management.

The S-GW 1a-06 hosts the functions such as packet routing and forwarding, transport level packet marking in the uplink and the downlink, mobility anchoring for inter-eNB handover etc.

FIG. 1B is a diagram illustrating a wireless protocol architecture in an LTE system to which the disclosure may be applied.

User plane protocol stack consists of PDCP 1b-01 or 1b-02, RLC 1b-03 or 1b-04, MAC 1b-05 or 1b-06 and PHY 1b-07 or 1b-08. Control plane protocol stack consists of NAS 1b-09 or 1b-10, RRC 1b-11 or 1b-12, PDCP, RLC, MAC and PHY.

Each protocol sublayer performs functions related to the operations listed in the table 4.

TABLE 4

| Sublayer | Functions |
|---|---|
| NAS | Authentication, mobility management, security control etc. |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Re-segmentation of RLC data PDUs, Concatenation/Segmentation/Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

FIG. 1C is a diagram illustrating the architecture of an 5G system and a NG-RAN to which the disclosure may be applied.

5G system consists of NG-RAN 1c-01 and 5GC 1c-02. An NG-RAN node is either:

A gNB, providing NR user plane and control plane protocol terminations towards the UE; or An ng-eNB, providing E-UTRA user plane and control plane protocol terminations towards the UE.

The gNBs 1c-05 or 1c-06 and ng-eNBs 1c-03 or 1c-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1c-07 and UPF 1c-08 may be realized as a physical node or as separate physical nodes.

A gNB 1c-05 or 1c-06 or an ng-eNBs 1c-03 or 1c-04 hosts the functions listed below.

Functions for Radio Resource Management such as Radio Bearer Control, Radio Admission Control, Connection Mobility Control, Dynamic allocation of resources to UEs in uplink, downlink and sidelink (scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1c-07 hosts the functions such as NAS signaling, NAS signaling security, AS security control, SMF selection, Authentication, Mobility management and positioning management.

The UPF 1c-08 hosts the functions such as packet routing and forwarding, transport level packet marking in the uplink, QoS handling and the downlink, mobility anchoring for mobility etc.

FIG. 1D is a diagram illustrating a wireless protocol architecture in an 5G system to which the disclosure may be applied.

User plane protocol stack consists of SDAP 1d-01 or 1d-02, PDCP 1d-03 or 1d-04, RLC 1d-05 or 1d-06, MAC 1d-07 or 1d-08 and PHY 1d-09 or 1d-10. Control plane protocol stack consists of NAS 1d-11 or 1d-12, RRC 1d-13 or 1d-14, PDCP, RLC, MAC and PHY.

Each protocol sublayer performs functions related to the operations listed in the Table 5.

TABLE 5

| Sublayer | Functions |
|---|---|
| NAS | Authentication, mobility management, security control etc. |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

FIG. IE is a diagram illustrating the architecture of an EN-DC to which the disclosure may be applied.

E-UTRAN supports MR-DC via E-UTRA-NR Dual Connectivity (EN-DC), in which a UE is connected to one eNB 1e-01 or 1e-02 that acts as a MN and one en-gNB 1e-03 or 1e-04 that acts as a SN. The eNB 1e-01 or 1e-02 is connected to the EPC 1e-05 via the S1 interface and to the en-gNB 1e-03 or 1e-04 via the X2 interface. The en-gNB 1e-03 or 1e-04 might also be connected to the EPC 1e-05 via the S1-U interface and other en-gNBs via the X2-U interface.

FIG. 1F is a diagram illustrating an example of a bandwidth part.

With Bandwidth Adaptation (BA), the receive and transmit bandwidth of a UE need not be as large as the bandwidth of the cell and can be adjusted: the width can be ordered to change (e.g. to shrink during periods of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

FIG. 1F describes a scenario where 3 different BWPs are configured:

BWP1 with a width of 40 MHz and subcarrier spacing of 15 kHz; 1f-11 or 1f-19

BWP2 with a width of 10 MHz and subcarrier spacing of 15 kHz; 1f-13 or 1f-17

BWP3 with a width of 20 MHz and subcarrier spacing of 60 kHz. 1f-15

FIG. 1G is a diagram illustrating an example of a search space and a control resource set.

A plurality of SSs may be configured in one BWP. The UE monitors PDCCH candidates according to the SS configuration of the currently activated BWP. One SS consists of an SS identifier, a CORESET identifier indicating the associated CORESET, the period and offset of the slot to be monitored, the slot unit duration, the symbol to be monitored in the slot, the SS type, and the like. The information may be explicitly and individually configured or may be configured by a predetermined index related to predetermined values.

One CORESET consists of a CORESET identifier, frequency domain resource information, symbol unit duration, TCI status information, and the like.

Basically, it can be understood that CORESET provides frequency domain information to be monitored by the UE, and SS provides time domain information to be monitored by the UE.

CORESET #0 and SS #0 may be configured in the IBWP. One CORESET and a plurality of SSs may be additionally configured in the IBWP. Upon receiving the MIB 1g-01, the UE recognizes CORESET #0 1g-02 and SS #0 1g-03 for receiving SIB1 using predetermined information included in the MIB. The UE receives SIB1 1g-05 through CORESET #0 1g-02 and SS #0 1g-03. In SIB1, information constituting CORESET #0 1g-06 and SS #0 1g-07 and information constituting another CORESET, for example, CORESET #n 1g-11 and SS #m 1g-13 may be included.

The terminal receives necessary information from the base station before the terminal enters the RRC_CONNECTED state, such as SIB2 reception, paging reception, and random access response message reception by using the CORESETs and SSs configured in SIB1. CORESET #0 1g-02 configured in MIB and CORESET #0 1g-06 configured in SIB1 may be different from each other, and the former is called a first CORESET #0 and the latter is called a second CORESET #0. SS #0 1g-03 configured in MIB and SS #0 1g-07 configured in SIB1 may be different from each other, and the former is referred to as a first SS #0 and the latter is referred to as a second SS #0. SS #0 and CORESET #0 configured for a RedCap terminal are referred to as a third SS #0 and a third CORESET #0. The first SS #0, the second SS #0, and the third SS #0 may be the same as or different from each other. The first CORESET #0, the second CORESET #0, and the third CORESET #0 may be the same as or different from each other. SS #0 and CORESET #0 are each indicated by a 4-bit index. The 4-bit index indicates a configuration predetermined in the standard specification. Except for SS #0 and CORESET #0, the detailed configuration of the remaining SS and CORSESET is indicated by each individual information element.

When the RRC connection is established, additional BWPs may be configured for the UE.

FIG. 2 illustrates the operation of UE and MN and SN for SCG activation and SCG deactivation.

The mobile communication system comprises at least UE 2a-01 and Master Node 2a-03 and Secondary Node 2a-05.

In 2a-11, UE transmits and MN receives LTE UECapability Information RRC message.

The UECapability Information message includes a first container for EUTRA capability and a second container for MRDC capability and a third container for NR capability. The UECapabilityInformation message includes a SCG deactivation related capability information. The SCG deactivation related capability information includes a one-bit indicator whether the terminal supports SCG deactivation for a first band combination list, the first band combination list comprises one or more band combinations. The first band combination list is included in the second container for MRDC capability. The SCG deactivation related capability information is included in the first container or in the second container.

In 2a-13, UE transmits and MN receives LTE RRCConnectionReconfiguration message.

The RRC message includes the configuration information determined based on the LTE UECapabilityInformation message. UE and MN perform data transfer using the configuration. At some point of time, MN determines that EN-DC operation with a SN is needed.

In 2a-21, MN sends SGNB Addition Request message to SN.

MN requests the SN to allocate resources for EN-DC connectivity operation for a specific UE by transmitting the message. In the SGNB Addition Request message, MN includes CG-ConfigInfo. CG-ConfigInfo is used by MN to request SN to perform certain actions e.g., to establish, modify or release an SCG. The message may include additional information e.g., to assist the SN to set the SCG configuration. CG-ConfigInfo includes following fields: ue-CapabilityInfo, measConfigMN etc. ue-CapabilityInfo includes UE capability information for NR and UE capability information for EN-DC. measConfigMN includes the measurement configuration configured by MN.

In 2a-23, SN sends SGNB Addition Request Acknowledge message to MN in response to SGNB Addition Request message.

SGNB Addition Request Acknowledge message may include followings; CG-Config, SCG-STATES etc.

CG-Config is used to transfer the SCG radio configuration as generated by SN. CG-Config includes following fields; scg-CellGroupConfig, scg-RB-Config, measConfigSN etc.

Scg-CellGroupConfig field contains the RRCReconfiguration message to be sent to the UE as generated by the SN.

Scg-RB-Config contains the IE RadioBearerConfig to be sent to the UE, used to (re-) configure the SCG RB configuration.

MeasConfigSN includes measurement configuration generated by SN.

SCG-STATES field includes a 1-bit information either indicating SCG is activated or SCG is deactivated. If SCG is to be deactivated. SN includes SCG-STATES indicating SCG deactivation in SCG Addition Request Acknowledge message. If SCG is to be activated, SN includes SCG-STATE indicating SCG activation or SN does not includes SCG-STATE in SCG Addition Request Acknowledge message.

If SCG-STATES is not included in SGNB Addition Request Acknowledge message or if SCG-STATE is set to a value indicating “SCG_activated”, MN does not include scg-State in RRCReconfiguration message. MN determines, based on absence of SCG-STATE or based on the value indicated in SCG-STATE in SGNB Addition Request Acknowledge message, that SCG is activated. UE determines, based on absence of scg-state in RRCReconfiguration message, that SCG is activated.

If SCG-STATES included in SGNB Addition Request Acknowledge message is set to a value indicating "SCG_deactivated", MN includes scg-State in LTE RRCConnectionReconfiguration message.

In 2a-25, MN transmits and UE receives LTE RRCConnectionReconfiguration message.

The LTE RRCConnectionReconfiguration message may include following field: rrc-TransactionIdentifier, scg-State, nr-Secondary CellGroupConfig, nr-RadioBearerConfig1, nr-RadioBearerConfig2 etc.

NR-Secondary CellGroupConfig field includes NR RRCReconfiguration message as generated by the SN. The NR RRCReconfiguration message is the one included in the scg-CellGroupConfig field.

In the NR RRCReconfiguration message, SN can configure measurement and radio link monitoring for each BWP of each serving cell.

NR RRCReconfiguration message can include secondaryCellGroup field and measConfig field.

Secondary CellGroup field includes CellGroupConfig IE for SCG.

UE determines SCG configuration and SCG status based on the received message. UE applies the determined SCG configuration and SCG status.

In 2a-27, UE transmits and MN receives LTE RRCConnectionReconfigurationComplete message.

LTE RRCConnectionReconfigurationComplete message includes following fields; rrc-TransactionIdentifier, scg-ConfigResponseNR.

Scg-ConfigResponseNR includes the NR RRCReconfigurationComplete message in response to NR RRCReconfiguration message included in the nr-Secondary CellGroupConfig field.

In 2a-29, MN transmits and SN receives SGNB Reconfiguration Complete message.

The purpose of the SGNB Reconfiguration Completion message is to provide information to the SN whether the requested configuration was successfully applied by the UE. SGNB Reconfiguration Complete includes NR RRCReconfigurationComplete message.

In 2a-31, UE and SN performs Random Access Procedure in the PSCell.

UE performs synchronisation towards the PSCell of the SN.

UE selects an UL BWP from a plurality of UL BWPs of the PSCell. UE selects the UL BWP indicated by firstActiveUplinkBWP-Id for Random Access procedure.

UE selects uplink for Random Access procedure based on a first rsrp threshold included in the ServingCellConfigCommon of PSCell.

UE selects a SSB from a plurality of SSBs measured in the DL BWP for Random Access procedure based on a second rsrp threshold included in the ServingCellConfigCommon of PSCell. The DL BWP is the one indicated by firstActiveDownlinkBWP-Id.

UE selects a preamble corresponding to the SSB.

FirstActiveUplinkBWP-Id and firstActiveDownlinkBWP-Id are included in the ServingCellConfig of PSCell. The ServingCellConfig of PSCell and the ServingCellConfigCommon of PSCell are included in the CellGroupConfig in NR RRCReconfiguration message in LTE RRCConnectionReconfiguration message.

UE transmits and SN receives a preamble in the PSCell. SN transmits and UE receives RAR in the PSCell.

UE and SN determines that SGNB addition is successful when Random Access procedure is successfully completed.

In 2a-33, UE and MN and SN perform EN-DC operation with activated SCG.

At some point of time, MN decides to deactivate SCG based on e.g. decreased traffic volume of the UE. MN performs SGNB Modification procedure to request SCG deactivation.

In 2a-41, MN transmits and SN receives SGNB Modification Request message.

SGNB Modification Request contains REQUEESTED-SCG-STATES field. If REQUESTED-SCG-STATES field includes an IE indicating "SCG_deactivation_requested", SN recognizes that SCG needs to be deactivated. If currently active SCG needs to be deactivated, MN sets REQUESTED-SCG-STATES field to "SCG_deactivation_requested". If currently deactivated SCG needs to be activated, MN sets REQUESTED-SCG-STATES field to "SCG_activation_requested."

SN determines whether to deactivate SCG or not based on received REQUESTED-SCG-STATES.

In 2a-42, SN transmits and MN receives SGNB Modification Request Acknowledge message.

SGNB Modification Request Acknowledge contains SCG-STATES field. SN sets SCG-STATES field to indicate "deactivate_SCG". MN recognizes that SCG is to be deactivated based on the received SCG-STATE.

If SCG-STATE field indicating "deactivate_SCG" is included in the SGNB Modification Request Acknowledge message, MN includes scg-State in LTERRCConnectionReconfiguration message. If SCG-STATE field indicating "activate SCG" is included in the SGNB Modification Request Acknowledge message, MN does not include scg-State in LTERRCConnectionReconfiguration message.

In 2a-43, MN transmits and UE receives LTE RRCConnectionReconfiguration message.

LTE RRCConnectionReconfiguration message includes scg-state field indicating "deactivated".

If the LTE RRCConnectionReconfiguration message includes the scg-State and if the LTE RRCConnectionReconfiguration message was received neither within mrdc-Secondary CellGroup nor within NR RRCResume message, UE consider the SCG to be deactivated.

If the LTE RRCConnectionReconfiguration message does not include the scg-State and if the LTE RRCConnectionReconfiguration message was received neither within mrdc-Secondary CellGroup nor within NR RRCResume message and if SCG is currently deactivated, UE consider the SCG to be activated.

Mrdc-SecondaryCellGroup field includes an RRC message for SCG configuration in NR-DC or NE-DC. For NR-DC (nr-SCG), mrdc-SecondaryCellGroup contains the RRCReconfiguration message as generated by SN gNB. For NE-DC (eutra-SCG), mrdc-Secondary CellGroup includes the E-UTRA RRCConnectionReconfiguration message.

In the NR RRCReconfiguration message, bfd-and-RLM field can be included within SpCellConfig field within CellGroupConfig IE for secondary CellGroup field.

In a NR RRCReconfiguration message, a bfd-and-RLM field and a plurality of purpose fields can be included.

If the bfd-and-RLM field is included, UE performs RLM on the first RadioLinkMonitoringRS set when the SCG is deactivated.

The first RadioLinkMonitoringRS set comprises one or more RadioLinkMonitoringRSs of which purpose field is set to 'rlf' or 'both' and that are configured for the first DL BWP of the PSCell.

If the bfd-and-RLM field is included, UE performs BFD on the second RadioLinkMonitoringRS set when the SCG is deactivated.

The second RadioLinkMonitoringRS set comprises one or more RadioLinkMonitoringRSs of which purpose field is set to 'beamFailure' or 'both' and that are configured for the first DL BWP of the PSCell.

In 2a-45, UE performs SCG deactivation operations.

UE generates LTE RRCConnectionReconfigurationComplete message.

In 2a-47, UE transmits and MN receives LTE RRCConnectionReconfigurationComplete message.

LTE RRCConnectionReconfigurationComplete message includes rrc-TransactionIdentifier. Based on rrc-TransactionIdentifier, MN recognizes that SCG is deactivated.

In 2a-49, MN transmits and SN receives SGNB Reconfiguration Complete message.

MN includes in SGNB Reconfiguration Complete message SFN-SUBFRAME IE. The SFN-SUBFRAME IE indicates SFN and subframe number when RRCConnectionReconfigurationComplete message in the response to RRCConnectionReconfiguration message activating or deactivating SCG is received from the UE. Alternatively, SFN-SUBFRAME indicates SFN and subframe number for the UL-SCH where MAC PDU containing the RRCConnectionReconfigurationComplete message is successfully received. SN recognizes based on SFN-SUBFRAME the time point when SCG is deactivated.

In 2a-51, UE, MN and SN perform EN-DC operation with deactivated SCG.

At some point of time, new data arrives to SCG bearer in UE. UE initiates UEAssistanceInformation transfer procedure to inform SN that SCG needs to be activated.

In 2a-53, UE transmits and MN receives LTE UEAssistanceInformation message.

LTE UEAssistanceInformation message may include uplinkData field. uplinkData field includes an IE enumerated with a single value of "true". MN recognizes that SCG needs to be activated based on the presence of uplinkData field.

MN determines to trigger SGNB Modification procedure to request SCG activation.

Alternatively, UE transmits and MN receives LTE ULInformationTransferMRDC message. The message includes a NR UEAssistanceInformation message.

Then MN transmits and SN receives a RRC Transfer message. The RRC Transfer message includes the NR UEAssistanceInformation message. SN determines to activate the SCG if the UEAssistanceInformation includes uplinkData field indicating the value of "true". Based on the determination, SN transmits and MN receives a SGNB Modification Required message. SN includes a SCG-STATE field indicating "activated" in the SGNB Modification Required message.

MN moves to 2a-65 if the SGNB Modification Required message including the SCG-STATE field indicating "activated" is received from the SN.

Alternatively, UE transmits and MN receives LTE ULInformationTransferMRDC message. The message includes a NR UEAssistanceInformation message.

Then MN transmits and SN receives a RRC Transfer message. The RRC Transfer message includes the NR UEAssistanceInformation message. SN determines to activate the SCG if the UEAssistanceInformation includes uplinkData field indicating the value of "true". Based on the determination, SN transmits and MN receives a SGNB Modification Required message. SN includes a NEXT-SCG-STATE field indicating "activated" in the SGNB Modification Required message.

MN transmits and SN receives SGNB Modification Request message which includes REQUESTED-SCG-STATE field and MCG configuration.

SN transmits and MN receives SGNB Modification Request Acknowledge message which includes SCG-STATE field and NR RRCReconfiguration message containing the new SCG configuration.

MN moves to 2a-65.

In 2a-61, MN transmits and SN receives SGNB Modification Request message.

MN includes Uplink Data Indicator in SGNB Modification Request message if LTE UEAssistanceInformation message include uplinkData field. Alternativey, MN can include REQUESTED-SCG-STATES field indicating "SCG_activation_requested" if LTE UEAssistanceInformation message include uplinkData field.

SN determines if SCG activation is possible. Based on the determination, SN generates SGNB Modification Request Acknowledge message.

In 2a-63, SN transmits and MN receives SGNB Modification Request Acknowledge message.

SN includes SCG-STATES in SGNB Modification Request message. If SN determined to activate SCG, SCG-STATES is set to "activated". If SN determined to not activate SCG, SCG-STATES is set to "deactivated".

In 2a-65, MN transmits and UE receives LTE RRCConnectionReconfiguration message.

If SCG-STATE was set to "activated", MN does not include scg-state field in the LTE RRCConnectionReconfiguration message.

If SCG-STATE was set to "deactivated", MN include scg-state field in the LTE RRCConnectionReconfiguration message.

If the LTE RRCConnectionReconfiguration message includes the scg-State and if the LTE RRCConnectionReconfiguration message was received neither within mrdc-Secondary CellGroup nor within NR RRCResume message, UE consider the SCG to be kept deactivated.

If the LTE RRCConnectionReconfiguration message does not include the scg-State and if the LTE RRCConnection-Reconfiguration message was received neither within mrdc-Secondary CellGroup nor within NR RRCResume message and if SCG is currently deactivated, UE consider the SCG to be activated.

The LTE RRCConnectionReconfiguration message can include NR RRCReconfiguration message comprising updated the SCG configuration.

In 2a-67, UE performs SCG activation operations.

UE generates LTE RRCConnectionReconfigurationComplete message.

In 2a-69, UE transmits and MN receives LTE RRCConnectionReconfigurationComplete message.

LTE RRCConnectionReconfigurationComplete message includes rrc-TransactionIdentifier and NR RRCReconfigurationComplete message (if NR RRCReconfiguration message was included in LTE RRCConnectionReconfiguration message). Based on rrc-TransactionIdentifier, MN recognizes that SCG is deactivated.

UE determines whether to perform random access procedure or not.

If NR RRCReconfiguration message was included in LTE RRCConnectionReconfiguration message, UE initiates the Random Access procedure on the SpCell of the SCG if all of Condition A and Condition B and Condition C and Condition D are fulfilled and at least one of Condition E and Condition F and Condition G is fulfilled. UE also initiates the Random Access procedure on the SpCell of the SCG if all of Condition A and Condition B and Condition C and Condition D1 are fulfilled. The reason is that beam needs to be selected via random access procedure if beam is not maintained during SCG deactivation. Hence if RLM/BFD is configured and if TA timer is running and if beam/radio link is maintained, random access is not needed. However if RLM/BFD is not configured random access upon SCG activation is required regardless of whether TA timer is running or expired.

Condition A: If the RRCReconfiguration message was received via E-UTRA SRB1.

Condition B: If the SCG is not deactivated (or if the SCG is activated) according to the E-UTRA RRC message containing the RRCReconfiguration message (i.e., if the E-UTRA RRC message does not include scg-State).

Condition B1: If the SCG is not deactivated (or if the SCG is activated) according to the E-UTRA RRC message not containing the RRCReconfiguration message (i.e., if the E-UTRA RRC message does not include scg-State).

Condition C: If the SCG was deactivated before the reception of the E-UTRA RRC message containing the RRCReconfiguration message.

Condition C1: If the SCG was deactivated before the reception of the E-UTRA RRC message not containing the RRCReconfiguration message.

Condition D: If RLM/BFD is configured for the deactivated PSCell (if bfd-and-RLM field was included in the SpCellConfig field in NR RRCReconfiguration message having received previously).

Condition D1: If RLM/BFD is not configured for the deactivated PSCell (if bfd-and-RLM field was not included in the SpCellConfig field in NR RRCReconfiguration message having received previously).

Condition E: If radio link failure is detected (or declared) for the SCG (or for the PSCell) during SCG is deactivated.

Condition F: If beam failure is detected (or declared) for the SCG (or for the PSCell) during SCG is deactivated.

Condition G: If TA timer for the PSCell (or TA timer for PTAG of SCG) is expired.

If NR RRCReconfiguration message was not included ir LTE RRCConnectionReconfiguration message, UE initiates the Random Access procedure on the SpCell of the SCG if all of Condition B1 and Condition C1 and Condition D are fulfilled and at least one of Condition E and Condition F and Condition G is fulfilled. UE also initiates the Random Access procedure on the SpCell of the SCG if all of Condition B1 and Condition C1 and Condition D1 are fulfilled.

In 2a-71, MN transmits and SN receives SGNB Reconfiguration Complete message.

MN includes in SGNB Reconfiguration Complete message SFN-SUBFRAME IE. The SFN-SUBFRAME IE indicates SFN and subframe number when RRCConnectionReconfigurationComplete message in response to the RRCConnectionReconfiguration message activating or deactivating SCG is received from the UE. Alternatively, SFN-SUBFRAME indicates SFN and subframe number for the UL-SCH where MAC PDU containing the RRCConnectionReconfigurationComplete message is successfully received. SN recognizes based on SFN-SUBFRAME the time point when SCG is deactivated.

In 2a-73, UE and SN performs Random Access Procedure.

UE performs synchronisation towards the PSCell of the SN.

UE selects an UL BWP from a plurality of UL BWPs of the PSCell. UE selects the UL BWP indicated by firstActiveUplinkBWP-Id for Random Access procedure.

UE selects uplink for Random Access procedure based on a first rsrp threshold included in the ServingCellConfigCommon of PSCell.

UE selects a SSB from a plurality of SSBs measured in the DL BWP for Random Access procedure based on a second rsrp threshold included in the ServingCellConfigCommon of PSCell. The DL BWP is the one indicated by firstActiveDownlinkBWP-Id.

UE selects a preamble corresponding to the SSB.

firstActiveUplinkBWP-Id and firstActiveDownlinkBWP-Id are included in the ServingCellConfig of PSCell. The ServingCellConfig of PSCell and the ServingCellConfig of PSCell are included in the CellGroupConfig in NR RRCReconfiguration message in LTE RRCConnectionReconfiguration message.

UE transmits and SN receives a preamble in the PSCell. SN transmits and UE receives RAR in the PSCell.

UE and SN determines that SGNB modification is successful when Random Access procedure is successfully completed.

In 2a-75, UE, MN and SN perform EN-DC operation with deactivated SCG.

<SCG Deactivation Operation>

UE performs "SCG bearer operation upon SCG deactivation" at slot n+RRC_Processing_delay_in_slot to disable data transmission over SCG.

UE performs "Lower layer operation upon SCG deactivation" at slot m+d to disable lower layer activity in SCG. d can be d1 or d2 or d3.

Slot n is the slot when RRC message triggering SCG state change is successfully received (or RRCConnectionReconfiguration message is successfully received or RRC message triggering SCG deactivation is received).

RRC_Processing_delay_in_slot is the number of slots in the first active DL BWP corresponding to the UE processing delay for RRC message. It is calculated by dividing the UE processing delay with the slot length.

Slot m is the slot when the transmission of the first RRCConnectionReconfigurationComplete message occurs. The first RRCConnectionReconfigurationComplete message is the response message to RRCConnectionReconfiguration message having triggered SCG deactivation.

d1 or d2 or d3 are SCG deactivation delays and have fixed values respectively.

| <SCG bearer operation upon SCG deactivation> |
| --- |
| If the UE was in RRC CONNECTED and the SCG was activated before receiving the message for which this procedure is initiated and if SRB3 was configured before the reception of the RRCConnectionReconfiguration and SRB3 is not to be released according to nr-RadioBearerConfig2 included in the RRCConnectionReconfiguration, UE trigger the PDCP entity of SRB3 to perform "SDU discard" and UE re-establish the RLC entity of SRB3. |

-continued

| <SCG bearer operation upon SCG deactivation> |
|---|
| UE trigger the PDCP entities of the first SCG DRBs to perform "SDU discard". UE trigger the PDCP entities of the second DRBs to perform "Data Recovery". UE re-establishes RLC entities of SCG DRBs. UE re-establishes SCG RLC entities of SN terminated split bearers. UE can suspend SCG DRBs. |

SCG DRB is a DRB with an RLC bearer only in the SCG.

For RLC entity re-establishment, RLC entity performs following actions. RLC entity discards all RLC SDUs and RLC SDU segments and RLC PDUs. RLC entity stop and reset all timers. RLC entity reset all state variables to their initial values.

First SCG DRB is the SCG DRB for which discardTimer is not configured.

Second SCG DRB is the SN terminated split DRB for which PDCP duplication is activated before reception of the RRC message triggering SCG deactivation.

For "SDU discard", PDCP entity discards all stored PDCP SDUs and PDCP PDUs.

For "Data recovery", PDCP entity perform retransmission of all the PDCP Data PDUs previously submitted to SCG AM RLC entities in ascending order of the associated COUNT values for which the successful delivery has not been confirmed by lower layers.

| <Lower Layer operation upon SCG deactivation> |
|---|
| UE deactivate all the SCells of the configured SCG at m+d1; |
| UE deactivate PSCell at m+d2; |
| UE reset MAC entity of SCG at m+d2; |
| UE stops bwp-InactivityTimer associated with PSCell at m+d3; |
| UE stops bwp-Inactivity Timer associated with SCell at m+d3; |
| UE flushes uplink HARQ buffers associated with the PSCell and SCells of PTAG at m+d2; |
| UE deactivates any active BWP associated with the SCells of the configured SCG at m+d1; |
| UE deactivates active UL/DL BWP associated with the PSCell and activates a first DL BWP associated with PSCell at m+d2. Alternatively, UE deactivates the current active UL BWP and keep the current active DL BWP active. |
| UE stops timeAlignmentTimers associated with STAG of SCG at m+d2. |
| UE stops timeAlignmentTimers associated with PTAG of SCG at m+d2 if beam failure detection and radio link monitoring are not configured to be performed for deactivated SCG. |
| If beam failure detection and radio link monitoring are configured to be performed for deactivated SCG: |
| UE keeps timeAlignmentTimers associated with PTAG of SCG; and |
| UE release PUCCH for all serving cells of SCG at m+d2+d4; and |
| UE release SRS for all serving cells of SCG at m+d2+d4; and |
| UE release any configured downlink assignments at m+d2+d4; and |
| UE release any PUSCH resource for semi-persistent CSI reporting for all serving cells of SCG at m+d2+d4. |

The first DL BWP associated with PSCell is the DL BWP indicated by firstActiveDownlinkBWP-Id of PSCell. Alternatively, the first DL BWP associated with PSCell is the initial DL BWP of the PSCell.

d1 is smaller than or equal to d2. d2 is smaller than or equal to d3. Applying different deactivation delay is to distribute the UE processing load properly. d4 is the delay related to RRC processing for resource release.

For deactivated PSCell, UE does not transmit SRS on the PSCell, UE does not report CSI for the PSCell, UE does not transmit on UL-SCH on the PSCell, UE does not transmit PUCCH on the PSCell, UE does not monitor the PDCCH for the PSCell and UE does not monitor the PDCCH on the PSCell.

For deactivated SCell, UE does not transmit SRS on the SCell, UE does not report CSI for the SCell, UE does not transmit on UL-SCH on the SCell, UE does not transmit PUCCH on the SCell, UE does not monitor the PDCCH for the SCell and UE does not monitor the PDCCH on the SCell.

For MAC reset, UE stops all timers except beamFailureDetectionTimer and timeAlignmentTimers associated with PSCell when the SCG is deactivated and RLM/BFD is configured for deactivated PSCell (i.e., bfd-and-RLM field was included within SpCellConfig field within CellGroupConfig IE for secondary CellGroup field), UE stops any ongoing Random Access procedure, UE stops Buffer Status Reporting procedure and UE stops Power Headroom Reporting procedure.

The timers stopped upon MAC reset includes periodic timers related with BSR or PHR, prohibit timer related to scheduling request, timeAlignmentTimer for STAG, sCellDeactivationTimer and DRX related timers (e.g. drx-onDurationTimer, drx-Inactivity Timer etc).

<SCG Activation Operation>

For SCG activation operation, UE performs "Lower layer operation upon SCG activation" at slot m+a to enable lower layer activity in SCG. a can be a1 or a2 or a3 or a4

Slot m is the slot when the transmission of the first RRCConnectionReconfigurationComplete message occurs. The first RRCConnectionReconfigurationComplete message is the response message to RRCConnectionReconfiguration message having triggered SCG deactivation.

a1 or a2 or a3 or a4 are SCG activation delays. a1 and a2 have fixed values respectively. a3 and a4 have varying values.

| <Lower Layer operation upon SCG activation> |
|---|
| UE activates the second DL BWP associated with the PSCell at m+a1 |
| UE activates the second UL BWP associated with the PSCell at m+a1 |
| UE starts CSI reporting on the second UL BWP associated with the PSCell at m+a2 |
| UE starts SRS transmission on the second UL BWP associated with the PSCell at m+a3 |
| UE starts PDCCH monitoring on the second DL BWP associated with the PSCell at m+a4 |

The second DL BWP associated with PSCell is the DL BWP indicated by firstActiveDownlinkBWP-Id of PSCell.

The second UL BWP associated with PSCell is the UL BWP indicated by firstActiveUplinkBWP-Id of PSCell.

<EN-DC Operation with Deactivated SCG>

UE and MN perform data transfer via MCG DRBs.

UE and SN perform data transfer via MCG RLC bearers of SN terminated split DRBs.

UE performs RLM on the first DL BWP associated with the PSCell based on the information included in RadioLinkMonitoringConfig and presence/absence of bfd-and-RLM.

UE performs BFD on the first DL BWP associated with the PSCell based on the information included in RadioLinkMonitoringConfig and presence/absence of bfd-and-RLM.

UE performs intra-frequency measurements associated with the deactivated SCG based on MeasConfig configured by SN and included in NR RRCReconfiguration message within LTE RRCConnectionReconfiguration message.

UE performs inter-frequency measurement based on MeasConfig configured by SN and included in NR RRCReconfiguration message within LTE RRCConnection-Reconfiguration message.

<EN-DC Operation with Activated SCG>

UE and MN perform data transfer via MCG DRBs.

UE and SN perform data transfer via MCG RLC bearers of SN terminated DRBs.

UE performs RLM on the second DL BWP associated with the PSCell based on the corresponding RadioLink-MonitoringConfig.

UE performs BFD on the second DL BWP associated with the PSCell based on the corresponding RadioLinkMonitor-ingConfig.

UE performs BFD on the second DL BWPs associated with each SCell based on the corresponding RadioLink-MonitoringConfig.

UE performs intra-frequency measurements associated with the activated SCell based on MeasConfig configured by SN and included in NR RRCReconfiguration message within LTE RRCConnectionReconfiguration message.

UE performs intra-frequency measurements associated with the deactivated SCell based on MeasConfig configured by SN and included in NR RRCReconfiguration message within LTE RRCConnectionReconfiguration message.

UE performs inter-frequency measurement based on MeasConfig configured by SN and included in NR RRCReconfiguration message within LTE RRCConnection-Reconfiguration message.

The second DL BWP associated with the PSCell is the currently active DL BWP of the PSCell.

The second DL BWP associated with a SCell is the currently active DL BWP of the SCell.

UE performs radio link quality measurements on the active DL BWPs of active serving cells based on the RadioLinkMonitoringConfig IE of the active DL BWP.

Radio link quality measurement is used to detect radio link failure and/or beam failure.

UE measures, for each serving cell, a plurality of Radi-oLinkMonitoringRS indicated in the RadioLinkMonitoring-Config.

UE performs intra-frequency measurement on the carrier frequencies of serving cells.

In the tables below, no DRX means DRX is not configured for SCG. In the tables below, DRX cycle and T_DRX are the DRX cycle currently applied for SCG.

In the below, no DRX_R means reference_DRX_cycle is not configured. In the tables below, DRX_R cycle and T_DRX_R are the reference_DRX_cycle. reference_DRX_cycle is not applied to DRX operation but used for determining various time period. Alternatively, reference_DRX_cycle is the DRX cycle configured for SCG. If two DRX cycles are configured for SCG, reference_DRX_cycle is the last used one before SCG is deactivated. Alternatively, reference_DRX_cycle is the long DRX cycle.

The reason for using reference_DRX_cycle is because SCG DRX is deactivated and currently applied DRX cycle does not exist when SCG is deactivated.

In the below, SMTC period for an intra-frequency measurement on a serving carrier is the periodicity of the primary measurement timing configuration (if only SMTC1 is configured) or the secondary measurement timing configuration (if both SMTC1 and SMTC2 are configured) or the longest SMTC period (if more than two SMTCs are configured) included in the MeasObject IE indicated by ServingCellMO of the corresponding serving cell.

In the below, SMTC period for an inter-frequency measurement is the periodicity of the primary measurement timing configuration (if only SMTC1 is configured) or the secondary measurement timing configuration (if both SMTC1 and SMTC2 are configured) or the longest SMTC period (if SMTC1 and SMTC2 and SMTC3 are configured) included in the MeasObject IE associated with corresponding frequency.

<Radio Link Monitoring>

UE evaluates, for the first BWP or the second BWP of the PSCell, whether the downlink radio link quality on the plurality of RadioLinkMonitoringRS estimated over the last T_Evaluate_out_SSB becomes worse than the threshold_Qout_SSB within T_Evaluate_out_SSB.

Threshold_Qout_SSB corresponds to the out-of-sync block error rate of PDCCH which is fixed to 10%.

UE evaluates, for the first BWP or the second BWP of the PSCell, whether the downlink radio link quality on the plurality of RadioLinkMonitoringRS estimated over the last T_Evaluate_in_SSB becomes better than the threshold_Qin_ SSB within T_Evaluate_in_SSB.

Threshold_Qin_SSB corresponds to the in-sync block error rate of PDCCH which is fixed to 2%.

When SCG is activated, T_Evaluate_out_SSB and T_Evaluate_in_SSB for the second BWP of the PSCell are determined as below.

No DRX:

T_Evaluate_out_SSB=Max (200, Ceil (10×P)×T_SSB)

T_Evaluate_in_SSB=Max (100, Ceil (5×P)×T_SSB)

DRX cycle≤320 ms:

T_Evaluate_out_SSB=Max (200, Ceil (15×P)×Max (T_DRX,T_SSB))

T_Evaluate_in_SSB=Max (100, Ceil (7.5×P)×Max (T_DRX,T_SSB))

DRX cycle>320 ms:

T_Evaluate_out_SSB=Ceil (10×P)×T_DRX

T_Evaluate_in_SSB=Ceil (5×P)×T_DRX

When SCG is deactivated, T_Evaluate_out_SSB and T_Evaluate_in_SSB for the first BWP of the PSCell are determined based on reference_DRX_cycle as below.

No DRX_R:

T_Evaluate_out_SSB=Max (200, Ceil (10×P)×T_SSB)

T_Evaluate_in_SSB=Max (100, Ceil (5×P)×T_SSB)

DRX_R cycle≤320 ms:

T_Evaluate_out_SSB=Max (200, Ceil (15×P)×Max (T_DRX_R,T_SSB))

T_Evaluate_in_SSB=Max (100, Ceil (7.5×P)×Max (T_DRX_R,T_SSB))

DRX_R cycle>320 ms:

T_Evaluate_out_SSB=Ceil (10×P)×T_DRX_R

T_Evaluate_in_SSB=Ceil (5×P)×T_DRX_R

UE determines whether RLF occurs based on the determination made above. Once RLF is declared, UE reports it to MN using SCGFailure message.

<Beam Failure Detection>

UE evaluates, for the first BWP or the second BWP of the PSCell, whether the downlink radio link quality on the plurality of RadioLinkMonitoringRS estimated over the last T_Evaluate_BFD_SSB becomes worse than the threshold_Qout_LR_SSB within Evaluation Period LR.

the threshold_Qout_LR_SSB corresponds to the out-of-sync block error rate of PDCCH which is fixed to 10%.

When SCG is activated, T_Evaluate_BFD_SSB is determined as below.

No DRX:

T_Evaluate_BFD_SSB=Max (50, Ceil (5×P)×T_SSB)

DRX CYCLE≤320 ms:

T_Evaluate_BFD_SSB=Max (50, Ceil (7.5×P)×Max (T_DRX,T_SSB))

DRX CYCLE>320 ms:

T_Evaluate_BFD_SSB=Ceil (5×P)×T_DRX

When SCG is deactivated, T_Evaluate_BFD_SSB is determined based on reference_DRX_cycle as below.

No DRX_R:

T_Evaluate_BFD_SSB=Max (50, Ceil (5×P)×T_SSB)

DRX_R CYCLE≤320 ms:

T_Evaluate_BFD_SSB=Max (50, Ceil (7.5×P)×Max (T_DRX_R,T_SSB))

DRX_R CYCLE>320 ms:

T_Evaluate_BFD_SSB=Ceil (5×P)×T_DRX_R

<Intra-Frequency Measurement>

A measurement is defined as a SSB based intra-frequency measurement provided the centre frequency of the SSB of the serving cell indicated for measurement and the centre frequency of the SSB of the neighbour cell are the same, and the subcarrier spacing of the two SSBs are also the same.

The UE identify new intra-frequency cells and perform SS-RSRP, SS-RSRQ, and SS-SINR measurements of identified intra-frequency cells.

UE identifies a new detectable intra-frequency cell within T_identify_intra_without_index if the UE is not indicated to report SSB based RRM measurement result with the associated SSB index (reportQuantityRsIndexes or maxNrofRSIndexesToReport is not configured), or the UE is indicated that the neighbour cell is synchronous with the serving cell (deriveSSB-IndexFromCell is enabled).

If the UE is indicated to report SSB based RRM measurement result with the associated SSB index (reportQuantityRsIndexes or maxNrofRSIndexesToReport is not configured), or if the UE is not indicated that the neighbour cell is synchronous with the serving cell (deriveSSB-IndexFromCell is disabled), UE identify a new detectable intra frequency cell within T_identify_intra_with_index.

The UE identify a new detectable intra frequency SS block of an already detected cell within T_identify_intra_without_index.

T_identify_intra_without_index=(T_PSS_SSS_sync_intra+T_SSB_measurement_period_intra) ms T_identify_intra_with_index (T_PSS_SSS_sync_intra+T SSB_measurement_period_intra+T_SSB_time_index_intra) ms T_PSS_SSS_sync_intra T_PSS_SSS_sync_intra is the time period used in PSS/SSS detection. T_PSS_SSS_sync_intra for an intra-frequency is determined based on SCG DRX cycle and whether the SCell corresponding to the frequency is activated or deactivated.

For an intra-frequency measurement associated with a SCG SCell when the corresponding SCell is activated and for an intra-frequency measurement associated with PSCell when the SCG is activated, T_PSS_SSS_sync_intra is determined as below.

No DRX:

T_PSS_SSS_sync_intra=max (600 ms, ceil (5×Kp)×SMTC period)×CSCF DRX CYCLE≤320 ms:

T_PSS_SSS_sync_intra=Max (50, Ceil (7.5×P)×Max (T_DRX,T_SSB)) DRX CYCLE>320 ms:

T_PSS_SSS_sync_intra=Ceil (5×P)×T_DRX

For an intra-frequency measurement associated with a SCG SCell when the corresponding SCell is deactivated and SCG is activated, T_PSS_SSS_sync_intra is determined as below.

No DRX:

T_PSS_SSS_sync_intra=5×measCycleSCell×CSCF

DRX CYCLE≤320 ms:

T_PSS_SSS_sync_intra=5×Max (measCycleSCell, 1.5×DRX CYCLE)×CSCF DRX CYCLE>320 ms:

T_PSS_SSS_sync_intra=5×Max (measCycleSCell, DRX CYCLE)×CSCF

For an intra-frequency measurement associated with a SCG SCell when the SCG is deactivated, T_PSS_SSS_sync_intra is equal to noOfMeasCycle×measCycleSCG x CSCF.

For an intra-frequency measurement associated with PSCell when the SCG is deactivated, T_PSS_SSS_sync_intra is equal to noOfMeasCycle x measCycleSCG x CSCF.

noOfMeasCycle is greater than 5 and configured per measObject. noOfMeasCycle is determined/configured by SN. A plurality of noOfMeasCycle are included in the RRCReconfiguration message of LTE RRCConnectionReconfiguration message.

Alternatively, when SCG is deactivated, for an intra-frequency measurement associated with a SCG SCell and an intra-frequency associated with PSCell, T_PSS_SSS_sync_intra is determined as below.

No DRX_R:

T_PSS_SSS_sync_intra=5×measCycleSCell×CSCF

DRX_R CYCLE≤320 ms:

T_PSS_SSS_sync_intra=5×Max (measCycleSCell, 1.5×DRX_R CYCLE)×CSCF

DRX_R CYCLE>320 ms:

T_PSS_SSS_sync_intra=5×Max (measCycleSCell, DRX_R CYCLE)×CSCF reference_DRX_cycle is configured per Cell Group. reference_DRX_cycle is determined/configured by SN. a reference_DRX_cycle is included in the RRCReconfiguration message of LTE RRCConnectionReconfiguration message where scg-State is included.

T_SSB_time_index_intra

T_SSB_time_index_intra is the time period used to acquire the index of the SSB being measured.

For an intra-frequency measurement associated with a SCG SCell when the corresponding SCell is activated and for an intra-frequency measurement associated with PSCell when the SCG is activated, T_SSB_time_index_intra is determined as below.

No DRX:

T_SSB_time_index_intra=max (120 ms, ceil (3×Kp)×SMTC period)×CSCF

DRX CYCLE≤320 ms:

T_SSB_time_index_intra=max (120 ms, ceil (M2×3×Kp)×max (SMTC period, DRX cycle))×CSCF DRX CYCLE>320 ms:

T_SSB_time_index_intra=Ceil (3×Kp)×DRX cycle×CSCF

For an intra-frequency measurement associated with a SCG SCell when the corresponding SCell is deactivated and SCG is activated, T_SSB_time_index_intra is determined as below.

No DRX:

T_SSB_time_index_intra=3×measCycleSCell×CSCF

DRX CYCLE≤320 ms:

T_SSB_time_index_intra=3×Max (measCycleSCell, 1.5×DRX CYCLE)×CSCF

DRX CYCLE>320 ms:

T_SSB_time_index_intra=3×Max (measCycleSCell, DRX CYCLE)×CSCF

For an intra-frequency measurement associated with a SCG SCell when the SCG is deactivated, T_SSB_time_index_intra is equal to noOfMeasCycle2×measCycleSCG×CSCF.

For an intra-frequency measurement associated with PSCell when the SCG is deactivated, T_SSB_time_index_intra is equal to noOfMeasCycle×measCycleSCG×CSCF.

noOfMeasCycle2 is greater than 3 and configured per measObject. noOfMeasCycle2 is determined/configured by SN. A plurality of noOfMeasCycle2 are included in the RRCReconfiguration message of LTE RRCConnectionReconfiguration message.

Alternatively, when SCG is deactivated, for an intra-frequency measurement associated with a SCG SCell and an intra-frequency associated with PSCell, T_SSB_time_index_intra is determined as below.

No DRX_R:

T_SSB_time_index_intra=3×measCycleSCell×CSCF

DRX_R CYCLE≤320 ms:

T_SSB_time_index_intra=3×Max (measCycleSCell, 1.5×DRX_R CYCLE)×CSCF

DRX_R CYCLE>320 ms:

T_SSB_time_index_intra=3×Max (measCycleSCell, DRX_R CYCLE)×CSCF

T_SSB_measurement_period_intra

T_SSB_measurement_period_intra is a measurement period of SSB based measurement.

For an intra-frequency measurement associated with a SCG SCell when the corresponding SCell is activated and for an intra-frequency measurement associated with PSCell when the SCG is activated, T_SSB_measurement_period_intra is determined as below.

No DRX:

T_SSB_measurement_period_intra=max (200 ms, ceil (5×Kp)×SMTC period)×CSCF

DRX CYCLE≤320 ms:

T_SSB_measurement_period_intra=max (200 ms, ceil (7.5×Kp)×max (SMTC period, DRX cycle))×CSCF DRX CYCLE>320 ms:

T_SSB_measurement_period_intra=Ceil (5×Kp)×DRX cycle×CSCF

For an intra-frequency measurement associated with a SCG SCell when the corresponding SCell is deactivated and SCG is activated, T_SSB_measurement_period_intra is determined as below.

No DRX:

T_SSB_measurement_period_intra=5×measCycleSCell×CSCF

DRX CYCLE≤320 ms:

T_SSB_measurement_period_intra=5×max (measCycleSCell, 1.5×DRX cycle)×CSCF

DRX CYCLE>320 ms:

T_SSB_measurement_period_intra=5×max (measCycleSCell, DRX cycle)×CSCF

For an intra-frequency measurement associated with a SCG SCell when the SCG is deactivated, T_SSB_measurement_period_intra is equal to noOfMeasCycle2×measCycleSCG×CSCF.

For an intra-frequency measurement associated with PSCell when the SCG is deactivated, T_SSB_measurement_period_intra is equal to noOfMeasCycle×measCycleSCG×CSCF.

Alternatively, when SCG is deactivated, for an intra-frequency measurement associated with a SCG SCell and an intra-frequency associated with PSCell, T_SSB_measurement_period_intra is determined as below.

No DRX_R:

T_SSB_measurement_period_intra=5×measCycleSCell×CSCF

DRX_R CYCLE≤320 ms:

T_SSB_measurement_period_intra=5×max (measCycleSCell, 1.5×DRX_R cycle)×CSCF

DRX_R CYCLE>320 ms:

5×max (measCycleSCell, DRX_R cycle)×CSCF

CSCF is a carrier specific scaling factor and is determined based on EN-DC scenario. It is equal to or greater than 1.

KP is determined based on whether measurement gap and SMTC are overlapped or not. It is equal to or greater than 1.

<Inter-Frequency Measurement>

A measurement is defined as an SSB based inter-frequency measurement if it is not defined as an intra-frequency measurement.

The UE identify new inter-frequency cells and perform SS-RSRP, SS-RSRQ, and SS-SINR measurements of identified inter-frequency cells if carrier frequency information is provided by PCell or PSCell.

UE identify a new detectable inter-frequency cell within T_identify_inter_without_index if the UE is not indicated to report SSB based RRM measurement result with the associated SSB index (reportQuantity RsIndexes or maxNrofRSIndexesToReport is not configured), or the UE is indicated that the neighbour cell is synchronous with the serving cell (deriveSSB-IndexFromCell is enabled).

If the UE is indicated to report SSB based RRM measurement result with the associated SSB index (reportQuantityRsIndexes or maxNrofRSIndexesToReport is not configured), or if the UE is not indicated that the neighbour cell is synchronous with the serving cell (deriveSSB-IndexFromCell is enabled), UE identify a new detectable inter frequency cell within T_identify_inter_with_index.

The UE identify a new detectable inter frequency SS block of an already detected cell within T_identify_inter_without_index.

T_identify_inter_without_index=(T_PSS_SSS_sync_inter+T_SSB_measurement_period_inter) ms T_identify_inter_with_index=(T_PSS_SSS_sync_inter+T_SSB_measurement_period_inter+T_SSB_time_index_inter) ms T_PSS_SSS_sync_inter T_PSS_SSS_sync_inter is the time period used in PSS/SSS detection for inter-frequency cell.

For an inter-frequency measurement configured by SN and associated with SCG, when the SCG is activated, T_PSS_SSS_sync_inter is determined as below.

No DRX:

T_PSS_SSS_sync_inter=Max (600 ms, 8×Max (MGRP, SMTC period))×CSCF DRX CYCLE≤320 ms:

T_PSS_SSS_sync_inter=Max (600 ms, Ceil (8×1.5)×Max (MGRP, SMTC period, DRX cycle))×CSCF DRX CYCLE>320 ms:

T_PSS_SSS_sync_inter=8×DRX cycle×CSCF

For an inter-frequency measurement configured by SN and associated with SCG, when the SCG is deactivated, T_PSS_SSS_sync_inter is equal to noOfMeasCycle_inter×measCycleSCG×CSCF.

noOfMeasCycle_inter is greater than 7 and configured per measObject. noOfMeasCycle_inter is determined/configured by SN. a plurality of noOfMeasCycle can be included in the RRCReconfiguration message of LTE RRCConnectionReconfiguration message.

Alternatively, when SCG is deactivated, for an inter-frequency measurement configured by SN and associated with SCG,T_PSS_SSS_sync_inter is determined as below.

No DRX_R:

T_PSS_SSS_sync_inter=Max (600 ms, 8×Max (MGRP, SMTC period))×CSCF DRX_R CYCLE≤320 ms:

T_PSS_SSS_sync_inter=Max (600 ms, Ceil (8×1.5)× Max (MGRP, SMTC period, DRX_R cycle))×CSCF DRX_R CYCLE>320 ms:

T_PSS_SSS_sync_inter=8×DRX_R cycle×CSCF

T_SSB_time_index_inter

T_SSB_time_index_inter is the time period used to acquire the index of the SSB being measured in inter-frequency cell.

For an inter-frequency measurement configured by SN and associated with SCG, when SCG is activated, T_SSB_time_index_intra is determined as below.

No DRX:

T_SSB_time_index_inter=Max (120 ms, 3×Max (MGRP, SMTC period))×CSCF DRX CYCLE≤320 ms:

T_SSB_time_index_inter=Max (120 ms, Ceil (3×1.5)× Max (MGRP, SMTC period, DRX cycle))×CSCF DRX CYCLE>320 ms:

T_SSB_time_index_inter=3×DRX cycle×CSCF

For an inter-frequency measurement configured by SN and associated with SCG, when SCG is deactivated, T_SSB_ time_index_inter is equal to noOfMeasCycle2_inter×measCycleSCG×CSCF.

noOfMeasCycle2_inter is greater than 3 and configured per measObject. noOfMeasCycle2_inter is determined/configured by SN. A plurality of noOfMeasCycle2_inter are included in the RRCReconfiguration message of LTE RRCConnectionReconfiguration message.

Alternatively, when SCG is deactivated, for an inter-frequency measurement configured by SN and associated with T_SSB_time_index_inter is determined as below.

No DRX_R:

T_SSB_time_index_inter=Max (120 ms, 3×Max (MGRP, SMTC period))×CSCF DRX_R CYCLE≤320 ms:

T_SSB_time_index_inter=Max (120 ms, Ceil (3×1.5)× Max (MGRP, SMTC period, DRX_R cycle))×CSCF DRX_R CYCLE>320 ms:

T_SSB_time_index_inter=3×DRX_R cycle×CSCF

T_SSB_measurement_period_inter

T_SSB_measurement_period_inter is a measurement period of SSB based inter-frequency measurement.

For an inter-frequency measurement configured by SN and associated with SCG, when SCG is activated, T_SSB_measurement_period_inter is determined as below.

No DRX:

T_SSB_measurement_period_inter=max (200 ms, ceil (5×Kp)×SMTC period)×CSCF

DRX CYCLE≤320 ms:

T_SSB_measurement_period_inter=max (200 ms, ceil (7.5×Kp)×max (SMTC period, DRX cycle))×CSCF DRX CYCLE>320 ms:

T_SSB_measurement_period_inter=Ceil (5×Kp)×DRX cycle×CSCF

For an inter-frequency measurement configured by SN and associated with SCG, when SCG is deactivated, T_SSB_measurement_period_inter is equal to noOfMeasCycle2_inter×measCycleSCG×CSCF.

Alternatively, when SCG is deactivated, for an inter-frequency measurement configured by SN and associated with SCG, T_SSB_time_index_inter is determined as below.

No DRX_R:

T_SSB_measurement_period_inter=max (200 ms, ceil (5×Kp)×SMTC period)×CSCF

DRX_R CYCLE≤320 ms:

T_SSB_measurement_period_inter=max (200 ms, ceil (7.5×Kp)×max (SMTC period, DRX_R cycle))×CSCF DRX_R CYCLE>320 ms:

T_SSB_measurement_period_inter=Ceil (5×Kp)× DRX_R cycle×CSCF

<CellGroupConfig>

CellGroupConfig IE includes following IEs; MAC-CellGroupConfig, PhysicalCellGroupConfig, SpCellConfig and a plurality of SCellConfig.

SpCellConfig IE includes following IEs; ReconfigurationWithSync, RLF-TimersAndConstants, ServingCellConfig.

ReconfigurationWithSync IE includes following IEs; ServingCellConfigCommon, RNTI-Value.

following SCellConfig IE includes IEs; ServingCellConfigCommon, ServingCellConfig.

mac-CellGroupConfig includes MAC parameters applicable for the entire cell group. mac-CellGroupConfig includes DRX-Config and TAG-Config.

DRX-Config is used to configure DRX related parameters. DRX-Config includes drx-LongCycleStartOffset field and drx-ShortCycle field. drx-LongCycleStartOffset field indicates long DRX cycle and drx-ShortCycle field indicates short DRX cycle.

TAG-Config includes a plurality of TimeAlignmentTimer IEs. Each of TimeAlignmentTimer IE indicates the duration in ms and can be associated with a PTAG or a STAG. TimeAlignmentTimer is also called TA timer.

Timing Advance Group is a group of Serving Cells that is configured by RRC and that is using the same timing reference cell and the same Timing Advance value. A Timing Advance Group containing the SpCell is referred to as Primary Timing Advance Group (PTAG), whereas the term Secondary Timing Advance Group (STAG) refers to other TAGs.

timeAlignmentTimer (per TAG) controls how long the MAC entity considers the Serving Cells belonging to the associated TAG to be uplink time aligned.

The MAC entity shall not perform any uplink transmission on a Serving Cell except the Random Access Preamble and MSGA transmission when the timeAlignmentTimer associated with the TAG to which this Serving Cell belongs is not running.

spCellConfig includes parameters for the SpCell of this cell group (PCell of MCG or PSCell of SCG).

PhysicalCellGroupConfig is used to configure cell-group specific L1 parameters

RLF-TimersAndConstants is used to configure UE specific timers and constants. RLF-Timers AndConstants IE includes following fields; t310, n310, n311, t311.

ServingCellConfigCommon is used to configure cell specific parameters of a UE's serving cell.

ServingCellConfig is used to configure (add or modify) the UE with a serving cell, which may be the SpCell or an SCell of an MCG or SCG. ServingCellConfig IE can include a bwp-Inactivity Timer field and a sCellDeactivationTimer field and a servingCellMO field.

The bwp-Inactivity Timer field indicates a duration in ms. UE falls back to the default Bandwidth Part of a serving cell when a bwp-Inactivity Timer of the corresponding serving cell expires.

sCellDeactivationTimer field indicates a duration in ms. UE deactivates a SCell when a sCellDeactivationTimer of the corresponding SCell expires.

servingCellMO field includes a measObjectId of the MeasObjectNR which is associated to the serving cell.

A single ServingCellConfigCommon and a single ServingCellConfig are signalled per serving cell (i.e., SpCell or an SCell of an MCG or SCG). A plurality of DL BWPs and a plurality of UL BWPs can be configured per serving cell. Each DL BWP of each serving cell can be configured with a RadioLinkMonitoringConfig IE.

ServingCellConfig includes a plurality of BWP-Downlink and a plurality of BWP-Uplink and a firstActiveDownlinkBWP-Id and a bwp-Inactivity Timer and a defaultDownlinkBWP-Id and a BWP-DownlinkDedicated for the initial DL BWP.

A BWP-Downlink IE includes a bwp-Id and a BWP-DownlinkCommon and a BWP-DownlinkDedicated.

A BWP-Uplink IE includes a bwp-Id and a BWP-UplinkCommon and a BWP-UplinkDedicated.

The bwp-Id is an integer between 0 and 4. bwp-Id 0 is used only for the BWP indicated in SIB1. bwp-Id1~4 can be used for the BWPs indicated in the RRCReconfiguration message.

BWP-DownlinkCommon IE includes following information: Frequency domain location and bandwidth of this bandwidth part, subcarrier spacing to be used in this BWP, cell specific parameters for the PDCCH of this BWP, cell specific parameters for the PDSCH of this BWP.

BWP-UplinkCommon IE includes following information: Frequency domain location and bandwidth of this bandwidth part, subcarrier spacing to be used in this BWP, cell specific parameters for the PUCCH of this BWP, cell specific parameters for the PUSCH of this BWP, Configuration of cell specific random access parameters.

BWP-DownlinkDedicated is used to configure the dedicated (UE specific) parameters of a downlink BWP. It includes cell specific parameters for the PDCCH of this BWP, cell specific parameters for the PDSCH of this BWP It includes RadioLinkMonitoringConfig 1E.

The BWP-UplinkDedicated is used to configure the dedicated (UE specific) parameters of an uplink BWP.

firstActiveDownlinkBWP-Id contains the ID of the DL BWP to be activated upon performing the RRC (re-) configuration.

defaultDownlinkBWP-Id is the ID of the downlink bandwidth part to be used upon expiry of the BWP inactivity timer.

<RadioLinkMonitoringConfig> radioLinkMonitoringConfig is UE specific configuration of radio link monitoring for detecting cell radio link failure occasions and beam radio link failure occasions. radioLinkMonitoringConfig includes following IEs; a plurality of RadioLinkMonitoringRS, beamFailureInstanceMaxCount, beamFailureDetectionTimer.

RadioLinkMonitoringRS IE includes a ssb-Index or csi-RS-Index. The index indicates reference signal that the UE shall use for radio link monitoring or beam failure detection.

RadioLinkMonitoringRS IE includes a purpose field. The purpose field indicates one of beamFailure or rlf or both.

<RadioBearerConfig>

NR-RadioBearerConfig1 and nr-RadioBearerConfig2 Include the NR RadioBearerConfig 1E. The field includes the configuration of RBs configured with NR PDCP. nr-RadioBearerConfig1 is MCG RB configuration and nr-RadioBearerConfig2 is SCG RB configuration. RadioBearerConfig in nr-RadioBearerConfig2 is the one included in the scg-RB-Config.

MCG RB is either MCG bearer or MN terminated split bearer. SCG RB is either SCG bearer or SN terminated split bearer. Split bearer is a radio bearer with RLC bearers both in MCG and SCG. SN terminated bearer is a radio bearer for which PDCP is located in the SN. SCG bearer is a radio bearer with an RLC bearer only in the SCG. MN terminated bearer is a radio bearer for which PDCP is located in the MN. MCG bearer is a radio bearer with an RLC bearer only in the MCG. RLC bearer is RLC configuration and MAC logical channel configuration of a radio bearer in one cell group.

<MeasConfig>

MeasConfig is configuration related to measurement and set by MN and SN separately. It comprises at least one measurement object (measObject), at least one report configuration (ReportConfig) and at least one measurement identity (measId). A measObject is identified by a MeasObjectId. A reportConfig is identified by a ReportConfigId. A measId comprises a measObjectId and a reportConfigId. MeasId instructs UE to perform a specific operation when measurement result on the associated measObject fulfils condition set by ReportConfigId. The measurement configuration includes measurement objects that are a list of objects on which the UE shall perform the measurements. For intra-frequency and inter-frequency measurements a measurement object indicates the frequency/time location and subcarrier spacing of reference signals to be measured.

For each intra-frequency and inter-frequency measurements, a measurement object is configured by a MeasObjectNR IE. The first NR RRCReconfiguration or the second NR RRCReconfiguration or the third RRCReconfiguration can include zero or one or more MeasObjectNRs.

A MeasObjectNR IE can includes a smtc1 field and a smtc2 field and a smtc3List field and a measCycle field and a measCycleSCG field and noOfMeasCycle field and noOfMeasCycle2 field and noOfMeasCycle_inter field.

smtc1 comprises a SSB-MTC (Measurement Timing Configuration) IE. A SSB-MTC IE includes a periodicity AndOffset IE and a duration IE. It is a primary measurement timing configuration.

Smtc2 comprises a SSB-MTC2 IE. A SSB-MTC2 IE includes pci-List IE and periodicity IE. It is a secondary measurement timing configuration applied to the cells listed in pci-List. The secondary measurement timing configuration has a different periodicity and a same offset comparing to the primary measurement timing configuration. smtc2 is an optional IE.

Smtc3List field comprises plurality of SSB-MTC3 IEs. a SSB-MTC3 IE includes a pci-List IE and a offset IE. smtc3List is used for the case where neighbor cell's offset is different, due to significantly different propagation delay, from what is indicated by the primary measurement timing. It is mainly used in NTN network. smtc3List is an optional IE. If smtc3List IE is present and smtc1 IE is not present in a measObject IE, UE is unable to comply with RRCReconfiguration and initiates the connection re-establishment procedure.

If smtc2 is present, for cells indicated in the pci-List parameter in smtc2 in the same MeasObject, the UE shall setup an additional SMTC in accordance with the received periodicity parameter in the smtc2 configuration and use the Offset and duration parameter from the smtc1 configuration.

The first subframe of each SMTC occasion occurs at an SFN and subframe of the NR SpCell meeting the above condition.

If smtc3list is present, for cells indicated in the pci-List parameter in each SSB-MTC3 element of the list in the same MeasObject IE, the UE shall setup an additional SS block measurement timing configuration in accordance with the received offset parameter from each SSB-MTC3 configuration and use the periodicity and duration parameters from the smtc1 configuration. The first subframe of each SMTC occasion of each SSB-MTC3 configuration occurs at an SFN and subframe of the NR SpCell meeting the above condition. The offset IE of each SSB-MTC3 is an integer selected (or determined) from the same integer set as used in the smtc1 for the periodicity determination.

The meas ObjectId of the MO which corresponds to each serving cell is indicated by servingCellMO within the serving cell configuration (i.e., ServingCellConfig).

The measCycle field of a MeasObject IE indicates a value in ms for determining various periods related to the measurements on intra-frequency when servingCellMO of a SCell indicates the MeasObject and the SCell is deactivated and the SCG is activated. The measCycleSCG field of a MeasObject IE indicates a value in ms for determining various periods related to the measurements on intra-frequency when servingCellMO of a SCell indicates the MeasObject and the SCell is deactivated and the SCG is deactivated.

The measCycleSCG field of a MeasObject IE indicates a value in ms for determining various periods related to the measurements on intra-frequency related with PSCell when servingCellMO of PSCell indicates the MeasObject and the SCG is deactivated.

The measCycleSCG field of a MeasObject IE indicates a value in ms for determining various periods related to the measurements on inter-frequency on the corresponding measurement object when SCG is deactivated.

NoOfMeasCycle field of a MeasObject IE indicates an integer value for determining various periods related to the measurement on intra-frequency when servingCellMO of a SCell indicates the MeasObject and the SCG is activated.

NoOfMeasCycle field of a MeasObject IE indicates an integer value for determining various periods related to the measurement on intra-frequency when servingCellMO of PSCell indicates the MeasObject and the SCG is deactivated.

NoOfMeasCycle2 field of a MeasObject IE indicates an integer value for determining various periods related to the measurement on intra-frequency when servingCellMO of a SCell indicates the MeasObject and the SCG is deactivated.

NoOfMeasCycle2 field of a MeasObject IE indicates an integer value for determining various periods related to the measurement on intra-frequency when servingCellMO of PSCell indicates the MeasObject and the SCG is deactivated.

NoOfMeasCycle_inter field of a MeasObject IE indicates an integer value for determining various periods related to the measurement on inter-frequency on the corresponding measurement object when SCG is deactivated.

<Terminal Operation>

In this disclosure, UE performs the following:

Transmitting, by the terminal to the master node, an UECapability Information message. The UECapabilityInformation message includes a first container for EUTRA capability and a second container for MRDC capability and a third container for NR capability. The UECapabilityInformation message includes a SCG deactivation related capability information. The SCG deactivation related capability information includes a one bit indicator whether the terminal supports SCG deactivation for a first band combination list, the first band combination list comprises one or more band combinations. The first band combination list is included in the second container for MRDC capability. The SCG deactivation related capability is included in the first container or in the second container.

Receiving by the terminal from a master base station a first LTE RRCConnectionReconfiguration message, the first LTE RRCConnectionReconfiguration message includes a first NR RRCReconfiguration message, the first NR RRCReconfiguration message includes a SCG configuration information.

Receiving by the terminal from a master base station a first LTE RRCConnectionReconfiguration message, the first LTE RRCConnectionReconfiguration message includes a first NR RRCReconfiguration message, the first NR RRCReconfiguration message includes a SCG configuration information. The SCG configuration information includes a plurality of radioLinkMonitoringConfig, each of the plurality of radioLinkMonitoringConfig includes a plurality of RadioLinkMonitoringRS, each of the plurality of RadioLinkMonitoringRS includes a ssb-index and a Purpose field, the Purpose field indicates one of beamFailure or rlf or both.

The first NR RRCReconfiguration message further includes a DRX-config, the DRX-config includes a first field indicating the length of a long DRX cycle and a second field indicating the length of a short DRX cycle.

Transmitting by the terminal to the master base station a first LTE RRCConnectionReconfigurationComplete message, the first LTE RRCConnectionReconfigurationComplete message includes a first NR RRCReconfigurationComplete message.

Receiving by the terminal from the master base station a second LTE RRCConnectionReconfiguration message, the second LTE RRCConnectionReconfiguration message includes a second NR RRCReconfiguration message and a scg-state field, the second NR RRCReconfiguration message includes a rrc-transactionIdentifier field and a bfd-and-RLM field and a RadioBearerConfig IE.

Transmitting by the terminal to the master base station a second LTE RRCConnectionReconfigurationComplete message, the second LTE RRCConnectionReconfigurationComplete message includes a second NR RRCReconfigurationComplete message, the second NR RRCReconfigurationComplete message includes a rrc-transactionIdentifier field indicating the same integer as included in the second NR RRCReconfiguration message.

Determining by the terminal to perform a first operation set and a second operation set if the second LTE RRCConnectionReconfiguration message includes the scg-State and if the second LTE RRCConnectionReconfiguration message was received neither within a NR RRCReconfiguration nor within a NR RRCResume message.

Starting by the terminal the first set of operation at a first time point, the first time point is determined based at least in part on a time point when the second LTE RRCConnectionReconfiguration message is received, the first set of operation comprises re-establishing PDCP entity of a SRB3 if SRB3 is not released according to the RadioBearerConfig 1E.

Starting by the terminal the second set of operation at a second time point, the second time point is determined based at least in part on a time point when the second LTE RRCConnectionReconfigurationComplete message is transmitted, the second set of operation comprises MAC reset.

The second set of operation further comprises stopping bwp-Inactivity Timer associated with PSCell and flushing uplink HARQ buffers associated with PSCell and flushing uplink HARQ buffers associated with a first SCell and deactivating the current active DL BWP and UL BWP associated with the PSCell and activating a first DL BWP associated with PSCell, the first SCell is SCell associated with PTAG of SCG, the first BWP associated with the PSCell is indicated by an index included in the second NR RRCReconfiguration message. The index of the first DL BWP could be different from firstActiveDownlinkBWP-Id of the PSCell. The index of the first downlink BWP could be included outside of ServingCellConfig of PSCell. The index of the first downlink BWP could be included in an upper-level IE than ServingCellConfig.

Receiving by the terminal from the master base station a third LTE RRCConnectionReconfiguration message.

Transmitting by the terminal to the master base station a third LTE RRCConnectionReconfigurationComplete message, the third LTE RRCConnectionReconfigurationComplete message includes a third NR RRCReconfigurationComplete message.

Determining by the terminal to perform a third operation set and a fourth operation set if the third LTE RRCConnectionReconfiguration message does not include the scg-State and if the LTE RRCConnectionReconfiguration message was received neither within a NR RRCReconfiguration message nor within NR RRCResume message and if SCG is deactivated when the third LTE RRCConnectionReconfiguration message is received.

Starting by the terminal the third set of operation at a third time point. The third time point is, if a random access procedure is not initiated for SCG activation, determined based at least in part on a fixed delay and a time point when the third LTE RRCConnectionReconfigurationComplete message is transmitted, the third set of operation comprise CSI reporting Starting by the terminal a fourth set of operation at a fourth time point. The fourth time point is, if a random access procedure is not initiated for SCG activation, determined based at least in part on a varying delay and time point when the second LTE RRCConnectionReconfigurationComplete message is transmitted, the fourth set of operation comprises SRS transmission.

Starting by the terminal the third set of operation at a third time point. The third time point is, if a random access procedure is initiated for SCG activation, determined based at least in part on a first varying delay and a time point when the terminal obtains a valid TA command for the PSCell (or for the SCG PTAG) during the random access procedure, the third set of operation comprises CSI reporting, the valid TA command is obtained when contention resolution is completed in the PSCell or when valid RAR is received in the PSCell.

Starting by the terminal a fourth set of operation at a fourth time point. The fourth time point is, if a random access procedure is initiated for SCG activation, determined based at least in part on a second varying delay and time point when the terminal obtains a valid TA command for the PSCell (or for the SCG PTAG) during the random access procedure. the fourth set of operation comprises SRS transmission Triggering, by the terminal, PDCP entities of the first SCG DRBs to perform a first operation set and PDCP entities of the second DRBs to perform a second operation set, the first SCG DRB is SCG DRB for which discardTimer is not configured, the second SCG DRB is the SN terminated split DRB for which PDCP duplication is activated before reception of the RRC message triggering SCG deactivation, the first operation set comprises discarding all stored PDCP SDUs and PDCP PDUs, the second operation set comprises performing retransmission of PDCP Data PDUs previously submitted to SCG AM RLC entities.

Evaluating, by the terminal, the downlink radio link quality of a first RadioLinkMonitoringRS based at least in part on a first threshold and the downlink radio link quality of a second RadioLinkMonitoringRS based at least in part on a second threshold if the scg-state field is included in the second LTE RRCConnectionReconfiguration message and the bfd-and-RLM field is included in the second NR RRCReconfiguration message.

The first RadioLinkMonitoringRS is included in the RadioLinkMonitoringConfig corresponding to a first DL BWP associated with the PSCell and the corresponding Purpose field is set to either rlf or both.

The second RadioLinkMonitoringRS is included in the RadioLinkMonitoringConfig corresponding to a first DL BWP associated with the PSCell and the corresponding Purpose field is set to either beamFailure or both.

The first threshold is fixed to a first value and the second threhold is fixed to a second value, the second value is higher than the first value.

The first DL BWP associated with PSCell is indicated by the second NR RRCReconfiguration message.

Performing by the terminal, if scg-state field is included in the second LTE RRCConnectionReconfiguration message, radio link monitoring on a first DL BWP associated with the PSCell based at least in part on a first RadioLinkMonitoringConfig included in the first NR RRCReconfiguration message and presence of bfd-and-RLM field in the second NR RRCReconfiguration message, the first DL BWP is indicated by an index in the first NR RRCReconfiguration message, the first RadioLinkMonitoringConfig is a RadioLinkMonitoringConfig associated with the first DL BWP, the first NR RRCReconfiguration message includes a plurality of RadioLinkMonitoringConfig, the second NR RRCReconfiguration message includes a bfd-and-RLM field.

Performing by the terminal, if scg-state field is included in the second LTE RRCConnectionReconfiguration message, beam failure detection on a first DL BWP associated with the PSCell based at least in part on a first RadioLinkMonitoringConfig included in the first NR RRCReconfiguration message and presence of bfd-and-RLM field in the second NR RRCReconfiguration message, the first DL BWP is indicated by an index in the first NR RRCReconfiguration message, the first RadioLinkMonitoringConfig is a RadioLinkMonitoringConfig associated with the first DL BWP, the first NR RRCReconfiguration message includes a plurality of RadioLinkMonitoringConfig, the second NR RRCReconfiguration message includes a bfd-and-RLM field.

Transmitting, by the terminal to the master base station, a LTE ULInformationTransferMRDC message if RLF is declared based at least in part on radio link monitoring.

The LTE ULInformationTransferMRDC message includes a NR SCGFailure message, the NR SCGFailure message includes a failureType field, the failureType field indicates a value indicating cause of RLF in deactivated SCG.

Initiating, by the terminal when NRRRCReconfiguration message triggering SCG activation is received, random access procedure on PSCell if beam failure was detected in deactivated SCG.

Performing by the terminal radio link monitoring on a first RadioLinkMonitoring set and beam failure detection on a second RadioLinkMonitoring set if bfd-and-RLM field is included in the second NR RRCReconfiguration message, the first RadioLinkMonitoring set comprises one or more RadioLinkMonitoringRSs of which purpose field is set to ‘rlf’ or ‘both’ and that are configured for the first DL BWP of the PSCell, the second RadioLinkMonitoringRS set comprises one or more RadioLinkMonitoringRSs of which purpose field is set to ‘beamFailure’ or ‘both’ and that are configured for the first DL BWP of the PSCell.

Initiating by the terminal random access procedure on the PSCell if the SCG is not deactivated according to the third LTE RRCConnectionReconfiguration message and if the SCG was deactivated before the reception of the third LTE RRCConnectionReconfiguration message and if UE is not configured to perform BFD and RLM when the SCGis deactivated.

Initiating by the terminal random access procedure on the PSCell if the SCG is not deactivated according to the third LTE RRCConnectionReconfiguration message and if the SCG was deactivated before the reception of the third LTE RRCConnectionReconfiguration message and if UE is configured to perform BFD and RLM when the SCG is deactivated and if radio link failure is detected for the SCG.

Initiating by the terminal random access procedure on the PSCell if the SCG is not deactivated according to the third LTE RRCConnectionReconfiguration message and if the SCG was deactivated before the reception of the third LTE RRCConnectionReconfiguration message and if UE is configured to perform BFD and RLM when the SCG is deactivated and if beam failure for PSCell is declared while SCG is deactivated.

Initiating by the terminal random access procedure on the PSCell if the SCG is not deactivated according to the third LTE RRCConnectionReconfiguration message and if the SCG was deactivated before the reception of the third LTE RRCConnectionReconfiguration message and if UE is configured to perform BFD and RLM when the SCG is deactivated and if timeAlignmentTimer associated with PTAG of SCG is not running.

Evaluating by the terminal the downlink radio link quality of a first DL BWP of PSCell estimated over a first period if SCG is not deactivated (or if SCG is activated) and evaluating by the terminal the downlink radio link quality of a second DL BWP of PSCell over a second period if SCG is deactivated, the first DL BWP is indicated in a NR RRCReconfiguration message triggering SCG activation, the second DL BWP is indicated in a NR RRCReconfiguration message triggering SCG deactivation, the first period is determined based at least in part on a first DRX cycle and the second period is determined based at least in part on a second DRX cycle, the first DRX cycle is the DRX cycle configured for SCG and currently applied to SCG, the second DRX cycle is the DRX cycle configured for SCG and currently not applied to SCG.

The second period is determined based at least in part on the first constant and the second DRX cycle if the second DRX cycle is smaller than or equal to 320 ms and based at least in part on the second constant and the second DRX cycle if the second DRX cycle is greater than 320 ms, the first constant is greater than the second constant.

Measuring by the terminal a intra-frequency cell associated with PSCell based at least in part on a first period, the first period for the intra-frequency cell associated with PSCell is determined based at least in part on a measCycle and a first DRX cycle when SCG is activated and based at least in part on the measCycle and the second DRX cycle when SCG is deactivated.

The first DRX cycle is the DRX cycle configured for SCG and currently applied to SCG, the second DRX cycle is the DRX cycle configured for SCG and currently not applied to SCG.

A plurality of measCycle are included in the second NR RRCReconfiguration message, the measCycle used in determining the first period for measuring the intra-frequency cell associated with the PSCell is a measCycle among the plurality of measCycle corresponding to the carrier frequency of the PSCell.

The first period is determined by comparing the measCycle and the second DRX cycle if the second DRX cycle is smaller than or equal to 320 ms and by comparing the measCycle and the second DRX cycle multiplied by a constant if the second DRX cycle is greater than 320 ms, the constant is greater than 1.

Measuring by the terminal a intra-frequency cell associated with PSCell based at least in part on a first period, the first period for the intra-frequency cell associated with PSCell is determined based at least in part on a measCycle and a first DRX cycle when SCG is activatedn and based at least in part on the measCycle and the second DRX cycle when SCG is deactivated.

The first DRX cycle is the DRX cycle configured for SCG and currently applied to SCG, the second DRX cycle is the DRX cycle configured for SCG and currently not applied to SCG.

A plurality of measCycle are included in the second NR RRCReconfiguration message, the measCycle used in dertermining the first period for the new intra-frequency cell associated with the PSCell is a measCycle among the plurality of measCycle corresponding to the carrier frequency of the PSCell.

The first period is determined by comparing the measCycle and the second DRX cycle if the second DRX cycle is smaller than or equal to 320 ms and the first period is determined by comparing the measCycle and the second DRX cycle multiplied by a constant, the constant is greater than 1.

Identifying by the terminal a intra-frequency cell associated with PSCell within a first period if the terminal is not indicated to report SSB based RRM measurement result with the associated SSB index.

The first period is determined by adding up a second period for PSS/SSS detection and a third period for intra-frequency measurement period.

The second period for the intra-frequency cell associated with PSCell is determined based at least in part on a first DRX cycle and a first constant when SCG is activated and based at least in part on the measCycle and a second DRX cycle and a first constant when SCG is deactivated.

The third period for the intra-frequency cell associated with PSCell is determined based at least in part on a first DRX cycle and a second constant when SCG is activated and based at least in part on the measCycle and a second DRX cycle and a second constant when SCG is deactivated.

The first DRX cycle is the DRX cycle configured for SCG and currently applied to SCG, the second DRX cycle is the DRX cycle configured for SCG and currently not applied to SCG.

A plurality of measCycle are included in the second NR RRCReconfiguration message. The measCycle used for determining the first period is a measCycle corresponding to the carrier frequency of the PSCell among the plurality of measCycle.

The second period of deactivated SCG is determined by comparing the measCycle and the second DRX cycle if the second DRX cycle is smaller than or equal to 320 ms and by comparing the measCycle and the second DRX cycle multiplied by a fourth constant if the second DRX cycle is greater than 320 ms. the fourth constant is greater than 1.

The third period of deactivated SCG is determined by comparing the measCycle and the second DRX cycle if the second DRX cycle is smaller than or equal to 320 ms and by comparing the measCycle and the second DRX cycle multiplied by a fifth constant if the second DRX cycle is greater than 320 ms. The fifth constant is greater than 1.

The first constant and the second constant are equal to each other. The first constant and the third constant and the fourth constant are different to each other.

Identifying by the terminal a intra-frequency cell associated with PSCell within a first period if the terminal is indicated to report SSB based RRM measurement result with the associated SSB index.

The first period is determined by adding up a second period for PSS/SSS detection and a third period for intra-frequency measurement period and a fourth period for SSB index acquisition.

The second period for the intra-frequency cell associated with PSCell is determined based at least in part on a measCycle and a first DRX cycle and a first constant when SCG is activated and based at least in part on the measCycle and a second DRX cycle and a first constant when SCG is deactivated.

The third period for the intra-frequency cell associated with PSCell is determined based at least in part on the measCycle and a first DRX cycle and a second constant when SCG is activated and based at least in part on the measCycle and a second DRX cycle and a second constant when SCG is deactivated.

The fourth period for the intra-frequency cell associated with PSCell is determined based at least in part on the measCycle and the first DRX cycle and a third constant when SCG is activated and based at least in part on the measCycle and the second DRX cycle and a third constant when SCG is deactivated.

The first DRX cycle is the DRX cycle configured for SCG and currently applied to SCG, the second DRX cycle is the DRX cycle configured for SCG and currently not applied to SCG.

A plurality of measCycle are included in the second NR RRCReconfiguration message. The measCycle used for determining the first period is a measCycle corresponding to the carrier frequency of the PSCell among the plurality of measCycle.

The second period of deactivated SCG is determined by comparing the measCycle and the second DRX cycle if the second DRX cycle is smaller than or equal to 320 ms and by comparing the measCycle and the second DRX cycle multiplied by a fourth constant if the second DRX cycle is greater than 320 ms. the fourth constant is greater than 1.

The third period of deactivated SCG is determined by comparing the measCycle and the second DRX cycle if the second DRX cycle is smaller than or equal to 320 ms and by comparing the measCycle and the second DRX cycle multiplied by a fifth constant if the second DRX cycle is greater than 320 ms. The fifth constant is greater than 1.

The fourth period of deactivated SCG is determined by comparing the measCycle and the second DRX cycle if the second DRX cycle is smaller than or equal to 320 ms and by comparing the measCycle and the second DRX cycle multiplied by a sixth constant if the second DRX cycle is greater than 320 ms. the sixth constant is greater than 1.

The first constant and the second constant are equal to each other. The first constant and the third constant and the fourth constant are different to each other.

Performing by the terminal inter-frequency measurement configured by a secondary node based at least in part on a first period if the SCG is activated and based at least in part on a second period if the SCG is deactivated.

The first period is determined by multiplying the first DRX cycle and a seventh constant if the first DRX cycle is smaller than or equal to 320 ms and by multiplying the first DRX cycle and a eighth constant if the first DRX cycle is greater than 320 ms.

The second period is determined by multiplying the second DRX cycle and a seventh constant if the second DRX cycle is smaller than or equal to 320 ms and by multiplying the second DRX cycle and a eighth constant if the second DRX cycle is greater than 320 ms.

The first DRX cycle is the DRX cycle configured for SCG and currently applied to SCG, the second DRX cycle is the DRX cycle configured for SCG and currently not applied to SCG.

The seventh constant is greater than the eighth constant.

<Base Station Operation>

In this disclosure, base station performs followings:

Transmitting, by the master node to the secondary node, a SGNB Addtion Request message for a terminal, the SGNB Addition Request message includes an UE capability information. The UE capability Information includes a first container for EUTRA capability and a second container for MRDC capability and a third container for NR capability. The UE capability Information includes a SCG deactivation related capability infomation. The SCG deactivation related capability information includes a one bit indicator whether the terminal supports SCG deactivation for a first band combination list, the first band combination list comprises one or more band combinations. The first band combination list is included in the second container for MRDC capability. The SCG deactivation related capability information is included in the first container or in the second container.

Receiving, by the master node from the secondary node, a SGNB Addition Request Acknowledge message for the terminal, the SGNB Addition Request Acknowledge message includes a NR RRCReconfiguration message, the NR RRCReconfiguration message includes a SCG configuration information for the UE.

Transmitting, by the master node to the terminal, a LTE RRCConnectionReconfiguration message, the LTE RRCConnectionReconfiguration message includes the NR RRCReconfiguration message generated by the secondary node.

SCG-State is not included in the LTE RRCConnectionReconfiguration message if SCG-STATE is not included in the SGNB Addition Request Acknowlege message or if SCG-STATE indicating a first value is included in the SGNB Addition Request Acknowlege message.

SCG-State is included in the LTE RRCConnectionReconfiguration message if SCG-STATE indicating a second value is included in the SGNB Addition Request Acknowlege message.

Receiving, by the master node from the terminal, a LTE RRCConnectionReconfigurationComplete message, the LTE RRCConnectionReconfigurationComplete message includes a NR RRCReconfigurationComplete message.

Transmitting, by the master node to the secondary node, a SGNB Reconfiguration Complete message. The SGNB Reconfiguration Complete message includes the NR RRCReconfigurationComplete message.

Transmitting, by the master node to the secondary node, a SGNB Modification Request message.

The SGNB Modification Request message includes a REQUESTED-SCG-STATE. MN sets the REQUESTED-SCG-STATE to a second value if SCG is required to be deactivated. MN sets the REQUESTED-SCG-STATE to a first value if SCG is required to be activated.

The second value indicates the SCG is required to be deactivated. The first value indicates the SCG is required to be activated.

Receiving, by the master node from the SN, a SGNB Modification Request Acknowledge. The SGNB Modification Request Acknowledge includes a SCG-STATE and a NR RRCReconfiguration message.

Transmitting, by the MN to the terminal, a LTE RRCConnectionReconfiguration. The LTE RRCConnectionReconfiguration message includes a scg-State and the NR RRCReconfiguration message generated by the secondary node.

SCG-State is not included in the LTE RRCConnection-Reconfiguration message if SCG-STATE indicating a first value is included in the SGNB Modification Request Acknowlege message.

SCG-State is included in the LTE RRCConnectionReconfiguration message if SCG-STATE indicating a second value is included in the SGNB Modification Request Acknowlege message.

Receiving, by the MN from the terminal, a LTE RRCConnectionReconfigurationComplete message. The LTE RRCConnectionReconfigurationComplete message includes a rrc-TransactionIdentifier field. The rrc-TransactionIdentifier field includes a value included in the rrc-TransactionIdentifier field of the LTE RRCConnectionReconfiguration message.

Transmitting, by the MN to the SN, a SGNB Reconfiguration Complete message. The SGNB Reconfiguration Complete message includes a SFN-SUBFRAME field. The SFN-SUBFRAME field includes the SFN and the subframe number determined based at least in part on the time point when the LTE RRCConnectionReconfigurationComplete message is received by the MN.

Re-establishing, by the SN, PDCP entity of a SRB3 at a first time point if SRB3 is not released according to the NR RRCReconfiguration. The first time point is determined based at least in part on the SFN-SUBFRAME field.

Receiving, by the MN from the terminal, a ULInformationTransferMRDC message, the ULInformationTransferMRDC message includes a UEAssistanceInformation message. The UEAssistanceInformation message includes an uplinkData field indicating a first value.

Transmitting, by the MN to the SN, a RRC TRANSFER message. The RRC TRANSFER message includes the UEAssistanceInformation.

Determining by the SN whether to activate the SCG or not based the presence of the UplinkData field and the value included in the UplinkData field within the UEAssistanceInformation.

Transmitting, by the SN to the MN, a SGNB Modificaiton Required message. SGNB Modification Required message includes optionally SCG-STATE field.

SCG-State is not included in the LTE RRCConnection-Reconfiguration message if SCG-STATE indicating a first value is included in the SGNB Modification Required message.

SCG-State is included in the LTE RRCConnectionReconfiguration message if SCG-STATE is not included in the SGNB Modification Required message and if the SGNB Modification Required message includes a NR RRCReconfiguration message.

Transmitting, by the MN to the terminal, a LTE RRCConnectionReconfiguration. The LTE RRCConnectionReconfiguration message does not include a scg-State if SGNB Modification Required message includes SCG-STATE field indicating the first value.

Transmitting, by the MN to the SN, a SGNB Reconfiguration Complete message. The SGNB Reconfiguration Complete message includes a SFN-SUBFRAME field. The SFN-SUBFRAME field includes the SFN and the subframe number determined based at least in part on the time point when the LTE RRCConnectionReconfigurationComplete message is received by the MN.

FIG. 3 illustrates the operation of the terminal.

In step **3*a*-11**, the terminal receives a first LTE RRCConnectionReconfiguration message from the master base station, the first LTE RRCConnectionReconfiguration message includes a first NR RRCReconfiguration message, and the first NR RRCReconfiguration message includes SCG configuration information. SCG configuration information includes a plurality of radioLinkMonitoringConfig, each of the plurality of radioLinkMonitoringConfig includes a plurality of RadioLinkMonitoringRS, each of the plurality of RadioLinkMonitoringRS includes a ssb-index and a Purpose field, and the Purpose field indicates one of beamFailure or rlf or both.

The first NR RRCReconfiguration message further includes DRX-config, and the DRX-config includes a first field indicating the length of a long DRX cycle and a second field indicating the length of a short DRX cycle.

In step **3*a*-13**, when the SCG is not deactivated (or activated), the downlink radio link quality of the first DL BWP of the PSCell estimated during the first period is evaluated by the terminal. When the SCG is deactivated, the downlink radio link quality of the second DL BWP of the PSCell estimated during the second period is evaluated by the UE.

The first DL BWP is indicated in the NR RRCReconfiguration message triggering SCG activation, the second DL BWP is indicated in the NR RRCReconfiguration message triggering SCG deactivation, the first period is determined based on the first DRX cycle, and the second period Is determined based on the second DRX cycle. The first DRX cycle is a DRX cycle configured for the SCG and applied to the current SCG, and the second DRX cycle is a DRX cycle configured for the SCG and not applied to the current SCG.

The second period is determined based at least in part on the first constant and the second DRX cycle when the second DRX cycle is equal to or less than 320 ms, and based at least in part on the second constant and the second DRX cycle when the second period is greater than 320 ms. The first constant is greater than the second constant.

FIG. 4A is a block diagram illustrating the internal structure of a UE to which the disclosure is applied.

Referring to the diagram, the UE includes a controller **4*a*-01, a storage unit 4*a*-02, a transceiver 4*a*-03, a main processor 4*a*-04 and I/O unit 4*a*-05**.

The controller **4*a*-01 controls the overall operations of the UE in terms of mobile communication. For example, the controller 4*a*-01 receives/transmits signals through the transceiver 4*a*-03. In addition, the controller 4*a*-01 records and reads data in the storage unit 4*a*-02. To this end, the controller 4*a*-01 includes at least one processor. For example, the controller 4*a*-01 may include a communication processor (CP) that performs control for communication and an application processor (AP) that controls the upper layer, such as an application program. The controller controls storage unit and transceiver such that UE operations illustrated in FIG. 2 and FIG. 3** are performed.

The storage unit 4*a*-02 stores data for operation of the UE, such as a basic program, an application program, and configuration information. The storage unit 4*a*-02 provides stored data at a request of the controller 4*a*-01.

The transceiver 4*a*-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4*a*-04 controls the overall operations other than mobile operation. The main processor 4*a*-04 process user input received from I/O unit 4*a*-05, stores data in the storage unit 4*a*-02, controls the controller 4*a*-01 for required mobile communication operations and forward user data to I/O unit 4*a*-05.

I/O unit 4*a*-05 consists of equipment for inputting user data and for outputting user data such as a microphone and a screen. I/O unit 4*a*-05 performs inputting and outputting user data based on the main processor's instruction.

FIG. 4B is a block diagram illustrating the configuration of a base station according to the disclosure.

As illustrated in the diagram, the base station includes a controller 4*b*-01, a storage unit 4*b*-02, a transceiver 4*b*-03 and a backhaul interface unit 4*b*-04.

The controller 4*b*-01 controls the overall operations of the main base station. For example, the controller 4*b*-01 receives/transmits signals through the transceiver 4*b*-03, or through the backhaul interface unit 4*b*-04. In addition, the controller 4*b*-01 records and reads data in the storage unit 4*b*-02. To this end, the controller 4*b*-01 may include at least one processor. The controller controls transceiver, storage unit and backhaul interface such that base station operation illustrated in FIG. 2A are performed.

The storage unit 4*b*-02 stores data for operation of the main base station, such as a basic program, an application program, and configuration information. Particularly, the storage unit 4*b*-02 may store information regarding a bearer allocated to an accessed UE, a measurement result reported from the accessed UE, and the like. In addition, the storage unit 4*b*-02 may store information serving as a criterion to determine whether to provide the UE with multi-connection or to discontinue the same. In addition, the storage unit 4*b*-02 provides stored data at a request of the controller 4*b*-01.

The transceiver 4*b*-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4*b*-04 provides an interface for communicating with other nodes inside the network. The backhaul interface unit 4*b*-04 converts a bit string transmitted from the base station to another node, for example, another base station or a core network, into a physical signal, and converts a physical signal received from the other node into a bit string.

What is claimed is:

1. A method performed by a terminal, the method comprising:

transmitting, by the terminal, to a base station a first Long Term Evolution (LTE) message, the first LTE message comprising a first container, a second container, and a third container, wherein the first container comprises E-UTRA capability information, and the second container comprises New Radio (NR) capability information;

receiving, by the terminal, from the base station a second LTE message;

performing, by the terminal, deactivation of Secondary Cell Group (SCG) in case that the second LTE message comprises a first field, wherein the first field includes information indicating that the SCG is deactivated;

performing, by the terminal, radio link monitoring for a Primary SCG Cell (PSCell) of the SCG that is deactivated in case that the PSCell was configured with bfd-and-RLM being set to true;

receiving, by the terminal, from the base station a third LTE message, wherein the third LTE message comprises a first NR message; and performing, by the terminal, random access procedure in case that:

the third LTE message does not comprise the first field;

the first NR message is received via Evolved Universal Terrestrial Radio Access (E-UTRA) Signaling Radio Bearer 1 (SRB1);

the SCG was deactivated before the third LTE message is received; and timeAlignmentTimer associated with a specific Timing Advance Group (TAG) is not running when the third LTE message is received.

2. The method of claim 1, wherein the third container comprises one or more band combinations for SCG deactivation support.

3. A terminal in a wireless communication system, the terminal comprising:

a transceiver configured to transmit and receive a signal, and a controller configured to control the transceiver to:

transmit, to a base station, a first Long Term Evolution (LTE) message, the first LTE message comprising a first container, a second container, and a third container, wherein the first container comprises E-UTRA capability information, and the second container comprises New Radio (NR) capability information;

receive, from the base station, a second LTE message;

perform deactivation of Secondary Cell Group (SCG) in case that the second LTE message comprises a first field, wherein the first field includes information indicating that the SCG is deactivated;

perform radio link monitoring for a Primary SCG Cell (PSCell) of the SCG that is deactivated in case that the PSCell was configured with bfd-and-RLM being set to true, receive, from the base station, a third LTE message, wherein the third LTE message comprises a first NR message; and perform random access procedure in case that:

the third LTE message does not comprise the first field;

the first NR message is received via Evolved Universal Terrestrial Radio Access (E-UTRA) Signaling Radio Bearer 1 (SRB1);

the SCG was deactivated before the third LTE message is received; and timeAlignmentTimer associated with a specific Timing Advance Group (TAG) is not running when the third LTE message is received.

4. The method of claim 1, wherein:

the radio link monitoring for the PSCell of the SCG that is deactivated is performed based on a specific periodicity; and the specific periodicity is determined based on discontinuous reception (DRX) cycle that is configured but not applied to the SCG.

5. The method of claim 1, further comprising:

in case that signaling radio bearer 3 (SRB3) was configured before the second LTE message was received and the SRB3 is not to be released according to the second LTE message:

discarding, by the terminal, all stored Packet Data Convergence Protocol (PDCP) Service Data Units (SDUs) and PDCP Protocol Data Units (PDUs) from a PDCP entity of the SRB3; and reestablishing, by the terminal, a Radio Link Control (RLC) entity of the SRB3.

* * * * *